(12) United States Patent
Zhang et al.

(10) Patent No.: US 12,724,319 B2
(45) Date of Patent: Sep. 1, 2026

(54) SYSTEM AND METHODS OF VISIBLE LIGHT SWEPT-SOURCE OPTICAL COHERENCE TOMOGRAPHY

(71) Applicants: Northwestern University, Evanston, IL (US); The Board of Trustees of The Leland Stanford Junior University, Stanford, CA (US)

(72) Inventors: Hao F. Zhang, Evanston, IL (US); Cheng Sun, Evanston, IL (US); Tingwei Zhang, Evanston, IL (US); Roman V. Kuranov, Evanston, IL (US); David Andrew Miller, Evanston, IL (US)

(73) Assignees: Northwestern University, Evanston, IL (US); The Board of Trustees of the Leland Stanford Junior University, Stanford, CA (US)

( * ) Notice: Subject to any disclaimer, the term of this patent is extended or adjusted under 35 U.S.C. 154(b) by 204 days.

(21) Appl. No.: 18/646,304

(22) Filed: Apr. 25, 2024

(65) Prior Publication Data

US 2024/0361665 A1 Oct. 31, 2024

Related U.S. Application Data

(60) Provisional application No. 63/462,083, filed on Apr. 26, 2023.

(51) Int. Cl.
*G02F 1/35* (2006.01)
*G02F 1/377* (2006.01)

(52) U.S. Cl.
CPC ............ *G02F 1/3534* (2013.01); *G02F 1/353* (2013.01); *G02F 1/3548* (2021.01); *G02F 1/377* (2013.01); *G02F 2202/32* (2013.01)

(58) Field of Classification Search
CPC .... G02F 1/3534; G02F 1/377; G02F 2202/32; G02F 1/353; G02F 1/3532; G02F 1/3548;
(Continued)

(56) References Cited

U.S. PATENT DOCUMENTS 4,650,321 A 3/1987 Thompson
5,981,179 A 11/1999 Lorinez et al.
(Continued)

FOREIGN PATENT DOCUMENTS

CN 105204289 A 12/2015
EP 2973897 B1 * 9/2019 ............ G02F 1/353
(Continued)

OTHER PUBLICATIONS

Alizadeh et al. (2000) “Distinct types of diffuse large B-cell lymphoma identified by gene expression profiling,” Nature 403: 503-511.

(Continued)

*Primary Examiner* — Michelle R Connelly
(74) *Attorney, Agent, or Firm* — Leydig, Voit & Mayer, Ltd.

(57) ABSTRACT

The present disclosure provides a new visible light swept source that enables ultrafast visible light OCT to operate at a faster rate to reduce the motion artifacts and increase the field of view without sacrificing image quality. The new visible light swept source further provides for improved roll-off performance and mitigation of influence of RIN and wash-out effect for wide-field imaging. With a much-improved increase in imaging speed, increased signal-to-noise ratio (SNR), and increased imaging depth, visible light swept-source OCT (vis-ss-OCT) has the capability to perform more accurate functional and structural imaging.

27 Claims, 12 Drawing Sheets

(58) Field of Classification Search
CPC ............ G02B 21/0032; G02B 21/0076; H01S 3/0092; H01S 5/0092
See application file for complete search history.

(56) References Cited

U.S. PATENT DOCUMENTS

| | | | |
|---|---|---|---|
| 5,998,796 | A | 12/1999 | Liu et al. |
| 7,149,395 | B1 | 12/2006 | Chen et al. |
| 8,049,900 | B2 | 11/2011 | Kemp et al. |
| 8,328,396 | B2 | 12/2012 | Capasso et al. |
| 8,599,388 | B1 | 12/2013 | van Dijk et al. |
| 8,987,754 | B1 | 3/2015 | Ribaudo et al. |
| 9,297,955 | B2 | 3/2016 | Bartoli et al. |
| 9,360,660 | B2 | 6/2016 | Yi et al. |
| 9,435,992 | B2 | 9/2016 | Kleppe et al. |
| 9,442,095 | B2 | 9/2016 | Jiao et al. |
| 9,513,260 | B2 | 12/2016 | Zhang et al. |
| 9,619,903 | B2 | 4/2017 | Yi et al. |
| 9,690,086 | B2 | 6/2017 | Foelling |
| 9,784,666 | B2 | 10/2017 | Mai et al. |
| 10,180,618 | B2 | 1/2019 | Akselrod et al. |
| 10,317,656 | B2 | 6/2019 | Dubois |
| 10,524,664 | B2 | 1/2020 | Liu et al. |
| 10,750,943 | B2 | 8/2020 | Soetikno et al. |
| 10,830,639 | B2 | 11/2020 | Urban et al. |
| 11,635,607 | B2 | 4/2023 | Song et al. |
| 2004/0023415 | A1 | 2/2004 | Sokolov et al. |
| 2005/0237493 | A1 | 10/2005 | Tajiri |
| 2007/0178067 | A1 | 8/2007 | Maier et al. |
| 2009/0236539 | A1 | 9/2009 | Stockman et al. |
| 2010/0110430 | A1 | 5/2010 | Ebbesen et al. |
| 2010/0226134 | A1 | 9/2010 | Capasso et al. |
| 2011/0021369 | A1 | 1/2011 | Mhlanga et al. |
| 2011/0081653 | A1 | 4/2011 | Hell et al. |
| 2012/0305802 | A1 | 12/2012 | Herz et al. |
| 2013/0027518 | A1 | 1/2013 | MacKay et al. |
| 2013/0147916 | A1 | 6/2013 | Bennett et al. |
| 2013/0228704 | A1 | 9/2013 | Kalkbrenner et al. |
| 2013/0272335 | A1 | 10/2013 | Ghannam |
| 2013/0314526 | A1 | 11/2013 | Yasuda et al. |
| 2014/0176678 | A1 | 6/2014 | Novikau et al. |
| 2014/0333750 | A1 | 11/2014 | Zhuang et al. |
| 2014/0340482 | A1 | 11/2014 | Kanarowski |
| 2015/0179938 | A1 | 6/2015 | Norris et al. |
| 2015/0192510 | A1 | 7/2015 | Piestun et al. |
| 2017/0307440 | A1 | 10/2017 | Urban et al. |
| 2017/0356734 | A1* | 12/2017 | Hendon ................ G02F 1/3775 |
| 2018/0001581 | A1 | 1/2018 | Patel et al. |
| 2018/0088048 | A1 | 3/2018 | Dong et al. |
| 2018/0242844 | A1 | 8/2018 | Liu et al. |
| 2019/0025476 | A1 | 1/2019 | Sun et al. |
| 2019/0082952 | A1 | 3/2019 | Zhang et al. |
| 2021/0016496 | A1 | 1/2021 | Chen et al. |
| 2024/0085670 | A1 | 3/2024 | Sun et al. |

FOREIGN PATENT DOCUMENTS

| | | | |
|---|---|---|---|
| WO | WO 2008/091296 | A2 | 7/2008 |
| WO | WO 2016/049544 | A1 | 3/2016 |
| WO | WO 2019/222605 | A1 | 11/2019 |

OTHER PUBLICATIONS

Altewischer E et al., "Polarization analysis of propagating surface plasmons in a subwavelength hole array," ARXIV.org, Cornell University Library, Aug. 8, 2012, 4 pages.

Ambrose et al. (1991) "Fluorescence Spectroscopy and Spectral Diffusion of Single Impurity Molecules in a Crystal," Letters to Nature 349: 225-227.

Anders (1981) "DNA Fluorescence at Room-Temperature Excited by Means of a Dye-Laser," Chemical Physics Letters 81(2): 270-272.

Ash et al. (1972) "Super-resolution aperture scanning microscope," Nature 237: 510-512.

Audic et al. (1997) "The Significance of Digital Gene Expression Profiles," Genomic Res. 7: 986-995.

Axelrod (1979) "Carbocyanine Dye Orientation in Red-Cell Membrane Studied by Microscopic Fluorescence Polarization," Biophysical Journal 26(3): 557-573.

Backer et al. (Jun. 2016) "Enhanced DNA imaging using super-resolution microscopy and simultaneous single-molecule orientation measurements," Optica Society of America, 3(6): 659-666.

Balzarotti et al. (Feb. 2017) "Nanometer resolution imaging and tracking of fluorescent molecules with minimal photon fluxes," Science 355: 606-612.

Bancaud et al. (2012) "A fractal model for nuclear organization: current evidence and biological implications," Nucleic Acids Research 40(18): 8783-8792.

Barbatti et al. (Month unavailable 2015) "Photoinduced Phenomena in Nucleic Acids I", Topics in Current Chemistry, Springer 355: 365 pages.

Basche et al. (2007) "Single-Molecule Optical Detection, Imaging and Spectroscopy" VCH Verlagsgesellschaft mbH, 15 pages.

Bates et al. (2010) "Sub-diffraction-limit imaging with stochastic optical reconstruction microscopy," In: Single Molecule Spectroscopy in Chemistry, Physics and Biology, Springer, pp. 399-415.

Betzig et al. (2006) "Imaging intracellular fluorescent proteins at nanometer resolution," Science 313: 1642-1645.

Blumberger (Oct. 2015) "Recent Advances in the Theory and Molecular Simulation of Biological Electron Transfer Reactions," Chemical Reviews 115: 11191-11238.

Boettiger et al. (Jan. 2016) "Super-resolution imaging reveals distinct chromatin folding for different epigenetic states," Nature 529: 418-422.

Bohrmann et al. (1993) "Concentration evaluation of chromatin in unstained resin-embedded sections by means of low-dose ratio-contrast imaging in STEM," Ultramicroscopy 49: 235-251.

Brenner et al. (2000) "Gene expression analysis by massively parallel signature sequencing (MPSS) on microbead arrays," Nature Biotechnology 18: 630-634.

Brenner et al. (2000) "In vitro cloning of complex mixtures of DNA on microbeads: Physical separation of differentially expressed cDNAs," Proc. Natl. Acad. Sci. 97(4): 1665-1670.

Buchvarov et al. (2007) "Electronic energy delocalization and dissipation in single- and double-stranded DNA," Proceedings of the National Academy of Sciences of the United States of America 104(12): 4794-4797.

Burzykowski et al. (2003) "Analysis of photon count data from single-molecule fluorescence experiments," Chemical Physics 288: 291-307.

Chee (1991) "Enzymatic multiplex DNA sequencing," Nucleic Acids Research 19(12): 3301-3305.

Chee et al. (1996) "Accessing Genetic Information with High-Density DNA Arrays," Science 274(5287): 610-614.

Chen et al. (2001) "Polarization spectroscopy of single CdSe quantum rods" Physical Review B, 64(24): 245304-1-245304-4.

Chen et al. (Oct. 2014) "Lattice light-sheet microscopy: Imaging molecules to embryos at high spatiotemporal resolution", Science 346(6208): 1257998-1-1257998-12.

Church et al. (1988) "Multiplex DNA sequencing," Science 240(4849): 185-188.

Collins et al. (1998) "New Goals for the U.S. Human Genome Project: 1998-2003," Science 282(5389): 682-689.

Cruz et al. (Feb. 2016) "Quantitative nanoscale imaging of orientational order in biological filaments by polarized superresolution microscopy." Proceedings of the National Academy of Sciences of the United States of America 113(7): E820-E828.

Daban (2003) "High concentration of DNA in condensed chromatin," Biochem. Cell Biol 81: 91-99.

De Clerck et al. (1994) "Use of fluorescent dyes in the determination of adherence of human leucocytes to endothelial cells and the effect of fluorochromes on cellular function," Journal of immunological methods 172: 115-124.

De Primo et al. (2003) "Expression profiling of blood samples from an SU5416 Phase III metastatic colorectal cancer clinical trial: a novel strategy for biomarker identification," BMC Cancer 3(3): 12 pp.

(56) References Cited

OTHER PUBLICATIONS

De Saizieu et al. (1998) "Bacterial transcript imaging by hybridization of total RNA to oligonucleotide arrays," Nature Biotechnology 16: 45-48.
Dempsey et al. (2011) "Evaluation of fluorophores for optimal performance in localization-based superresolution imaging," Nature Methods 8(12): 1027-1036.
Dimaria (1999) "Electron energy dependence of metal-oxide-semiconductor degradation," Applied physics letters 75(16): 2427-2428.
Docter et al., "Measuring the wavelength-dependent divrgence of transmission through sub-wavelength hole-arrays by spectral imaging," Optics Express, vol. 14, No. 20, Oct. 2, 2006, pp. 9477-9482.
Dong et al. (Apr. 2017) "Stochastic fluorescence switching of nucleic acids under visible light illumination," Optics Express 25(7): 7929-7944.
Dong et al. (Aug. 2016) "Superresolution intrinsic fluorescence imaging of chromatin utilizing native, unmodified nucleic acids for contrast," Proceedings of the National Academy of Science 113(35): 9716-9721.
Dong et al. (Jul. 2016) "Super-resolution spectroscopic microscopy via photon localization", Nature Communications 7, 12290: 1-8.
Dunn et al. (2011) "A practical guide to evaluating colocalization in biological microscopy," American Journal of Physiology—Cell Physiology 300: C723-C742.
Ellis et al. (2003) "Cell biology—Join the crowd," Nature, 425: 27-28.
Fan et al. (2000) "Parallel Genotyping of Human SNPs Using Generic High-density Oligonucleotide Tag Arrays," Genome Research 10: 853-860.
Fercher et al. (2003) "Optical coherence tomography—principles and applications, Reports on Progress in Physics", vol. 66, pp. 239-303.
Folling et al. (2008) "Fluorescence nanoscopy by ground-state depletion and single-molecule return," Nature Methods 5(11): 943-945.
Gan et al. (2012) "Coherence Converting Plasmonic Hole Arrays," Plasmonics, Kluwer Academic Publishers-Plenum Publishers, NE, vol. 7, No. 2, Jan. 21, 2012, pp. 313-322.
Gao et al. (2012) "Snapshot hyperspectral retinal camera with the Image Mapping Spectrometer (IMS)" Biomedical Optics Express 3(1): 48-54.
Gbur et al., "The Structure of Partially Coherent Fields," Progress in Optics, Elsevier Science Publishers B.V., vol. 55, Chapter 5, Jan. 1, 2010, pp. 285-341.
Gerry et al. (1999) "Universal DNA microarray method for multiplex detection of low abundance point mutations," J. Mol. Biol. 292(2): 251-262.
Golub et al. (1999) "Molecular Classification of Cancer: Class Discovery and Class Prediction by Gene Expression Monitoring," Science 286(5439): 531-537.
Gould et al. (2008) "Nanoscale imaging of molecular positions and anisotropies", Nature Methods 5(12): 1027-1030.
Greffet et al. (2002) "Coherent emission of light by thermal sources," Nature, vol. 416, pp. 61-64.
Guebrou et al. (2012) "Coherent emission from a disordered organic semiconductor induced by strong coupling with surface plasmons," Physical Review Letters, vol. 108, 066401.
Gustafsson (2000) "Surpassing the lateral resolution limit by a factor of two using structured illumination microscopy," Journal of microscopy 198(Pt 2): 82-87.
Hacia (1999) "Resequencing and mutational analysis using oligonucleotide microarrays," Nature Genetics Supplement 21: 42-47.
Hakak et al. (2001) "Genome-wide expression analysis reveals dysregulation of myelination-related genes in chronic schizophrenia," Proc. Natl. Acad. Sci. 98(8): 4746-4751.
Hedegaard et al. (2011) "Spectral unmixing and clustering algorithms for assessment of single cells by Raman microscopic imaging," Theoretical Chemistry Accounts 130: 1249-1260.
Hell et al. (1994) "Breaking the diffraction resolution limit by stimulated emission: stimulated-emission-depletion fluorescence microscopy," Optics letters 19(11): 780-782.
Hell et al. (1995) "Ground-State-Depletion Fluorescence Microscopy—a Concept for Breaking the Diffraction Resolution Limit," Appl Phys B-Lasers, 60, 495-497.
Hiraoka et al. (2002) "Multispectral imaging fluorescence microscopy for living cells", Cell Structure and Function 27(5): 367-374.
Hotta et al. (2010) "Spectroscopic rationale for efficient stimulated-emission depletion microscopy fluorophores," Journal of the American Chemical Society 132: 5021-5023.
Hu et al (Jul. 2015) "Deep convolutional neural networks for hyperspectral image classification," Journal of Sensors, 2015: 1-12.
Hu et al. (1985) "Hot-electron-induced MOSFET degradation—model, monitor, and improvement," Solid-State Circuits, IEEE Journal of, SC-20(1): 295-305.
Huang et al. (2008) "Three-dimensional super-resolution imaging by stochastic optical reconstruction microscopy," Science 319:810-813.
Jing et al. (2011) "Chemical Tags for Labeling Proteins Inside Living Cells," Accounts of Chemical Research 44(9):784-792.
Johnson et al. (2007) "Snapshot hyperspectral imaging in ophthalmology", Journal of Biomedical Optics 12(1): 014036-1-014036-7.
Jones et al. (2011) "Fast, three-dimensional super-resolution imaging of live cells," Nature Methods 8(6): 499-505.
Juette et al. (Apr. 2016) "Single-molecule imaging of non-equilibrium molecular ensembles on the millisecond timescale" Nature Methods 13(4): 341-344.
Khoobehi (publicly available Dec. 2013) "A new snapshot hyperspectral imaging system to image optic nerve head tissue", Acta Ophthalmologica 92(3): e241, 1pp. (published May 2014).
Klar et al. (2000) "Fluorescence microscopy with diffraction resolution barrier broken by stimulated emission," PNAS 97(15): 8206-8210.
Kolmakov et al. (2010) "Red-Emitting Rhodamine Dyes for Fluorescence Microscopy and Nanoscopy," Chemistry—A European Journal 16: 158-166.
Kundukad et al. (Oct. 2014) "Effect of YOYO-1 on the mechanical properties of DNA," Soft Matter 10: 9721-9728.
Lampe et al. (2012) "Multi-colour direct STORM with red emitting carbocyanines," Biology of the Cell 104: 229-237.
Larsson et al. (1994) "Characterization of the Binding of the Fluorescent Dyes YO and YOYO to DNA by Polarized-Light Spectroscopy," Journal of the American Chemical Society 116(19): 8459-8465.
Le Gros et al. (2005) "X-ray tomography of whole cells," Current opinion in structural biology 15: 593-600.
Lecun et al. (1998) "Gradient-based learning Applied to Document Recognition," Proceedings of the IEEE 86(11): 2278-2324.
Lelek et al. (2012) "Superresolution imaging of HIV in infected cells with FIAsH-PALM," PNAS 109(22): 8564-8569.
Levenson et al. (2006) "Multispectral Imaging in Biology and Medicine: Slices of Life", Cytometry Part A 69a(8): 748-758.
Levi et al. (2005) "Chromatin Dynamics in Interphase Cells Revealed by Tracking in a Two-Photon Excitation Microscope," Biophysical Journal 89: 4275-4285.
Lewis et al. (1984) "Development of a 500 Å spatial resolution light microscope: I. light is efficiently transmitted through λ/16 diameter apertures," Ultramicroscopy 13: 227-231.
Noh et al. (2011) "Perfect coupling of light to surface plasmons by coherent absorption," ARXIV.org, Cornell University Library, Oct. 22, 2011, 10 pages.
Ovesny et al. (Apr. 2014) "ThunderSTORM: a comprehensive ImageJ plug-in for PALM and STORM data analysis and super-resolution imaging," Bioinformatics 30(16): 2389-2390.
Oxenløwe et al. (2009) "640-Gbit/s data transmission and clock recovery using an ultrafast periodically poled lithium niobate device," Journal of Lightwave Technology, 27(3), 205-213. https://doi.org/10.1109/JLT.2008.2009322.
Pearson (1901) "On lines and planes of closest fit to systems of point in space," Philosophical Magazine 2: 559-572.
Perou et al. (2000) "Molecular portraits of human breast tumours," Nature 406: 747-752.

(56) References Cited

OTHER PUBLICATIONS

Pfeiffer et al. (2000) "High-pressure freezing Provides New Information on Human Epidermis: Simultaneous Protein Antigen and Lamellar Lipid Structure Preservation. Study on Human Epidermis by Cryoimmobilization," Journal of Investigative Dermatology 114(5): 1030-1038.
Plessow et al. (2000) "Intrinsic time- and wavelength-resolved fluorescence of oligonucleotides: A systematic investigation using a novel picosecond laser approach," J. Phys. Chem. B 104: 3695-3704.
Radko et al. (2007) "Surface plasmon polariton beam focusing with parabolic nanoparticle chains," Optics Express, vol. 15, No. 11, pp. 6576-6582, 2007.
Razin et al. (Feb. 2014) "Chromatin without the 30-nm fiber Constrained disorder instead of hierarchical folding," Epigenetics 9(5): 653-657.
Resch-Genger et al. (2008) "Quantum dots versus organic dyes as fluorescent labels," Nature methods 5(9): 763-775.
Rinia et al. (2008) "Quantitative label-free imaging of lipid composition and packing of individual cellular lipid droplets using multiplex CARS microscopy," Biophysical journal 95: 4908-4914.
Rostaing et al. (2004) "Preservation of immunoreactivity and Fine Structure of Adult C. elegans Tissues Using High-pressure freezing," Journal of Histochemistry & Cytochemistry, 52(1): 1-12.
Roy et al. (Feb. 2015) "Nanocytological Field Carcinogenesis Detection to Mitigate Overdiagnosis of Prostate Cancer: A Proof of Concept Study," Plos One 10(2): 1-10.
Rust et al. (2006) "Sub-diffraction-limit imaging by stochastic optical reconstruction microscopy (STORM)," Nature Methods 3(10): 793-795.
Schmied et al. (May 2014) "DNA origami-based standards for quantitative fluorescence microscopy," Nature Protocols 9(6): 1367-1391.
Shipp et al. (2002) "Diffuse large B-cell lymphoma outcome prediction by gene-expression profiling and supervised machine learning," Nature Medicine 8(1): 68-74.
Shoemaker et al. (1996) "Quantitative phenotypic analysis of yeast deletion mutants using a highly parallel molecular bar-coding strategy," Nature Genetics 14: 450-456.
Shtein et al. (2002) "Effects of film morphology and gate dielectric surface preparation on the electrical characteristics of organic-vapor-phase-deposited pentacene thin-film transistors," Applied physics letters 81(2): 268-270.
Singh et al. (2013) "Localized Surface Plasmons Enhanced Light Transmission into c-Silicon Solar Cells," Journal of Solar Energy, vol. 8, No. 5, Jan. 1, 2013, pp. 1461-1466.
Soltys et al. (1992) "Interrelationships of endoplasmic reticulum, mitochondria, intermediate filaments, and microtubules—a quadruple fluorescence labeling study," Biochemistry and Cell Biology 70: 1174-1186.
Sorokin et al. (1966) "Stimulated emission observed from an organic dye, chloro-aluminum phthalocyanine," IBM Journal of Research and Development 10(2): 162-163.
Takaya et al. (2008) "UV excitation of single DNA and RNA strands produces high yields of exciplex states between two stacked bases," PNAS 105(30): 10285-10290.
Thomas et al. (2001) "Identification of toxicologically predictive gene sets using cDNA microarrays," Mol. Pharmacol. 60(6): 1189-1194.
Tremethick (2007) "Higher-order structures of Chromatin: The elusive 30 nm Fiber," Cell 128: 651-654.
Underwood (2000) "Monochromators and spectrographs using varied line spacing gratings," AIP Conference Proceedings 521: 117-122.
Urban et al. (Jun. 2016) "Subsurface Super-resolution Imaging of Unstained Polymer Nanostructures," Scientific Reports 6, 28156: 1-9.
Van Driel et al. (2009) "Tools for correlative cryo-fluorescence microscopy and cryo-electron tomography applied to whole mitochondria in human endothelial cells," European Journal of Cell Biology 88: 669-684.
Vaya et al. (2010) "Fluorescence of Natural DNA: From the Femtosecond to the Nanosecond Time Scales," J. Am. Chem. Soc. 132(34):11834-11835.
Velculescu et al. (1995) "Serial Analysis of Gene Expression," Science 270(5235): 484-487.
Vincent et al. (2008) "Application of Optical Coherence Tomography for Monitoring Changes in Cervicovaginal Epithelial Morphology in Macaques:Potential for Assessment of Microbicide Safety" Sexually Transmitted Diseases 35(3): 269-275.
Vincent et al. (2009) "High Resolution Imaging of Epithelial Injury in then Sheep Cervicovaginal Tract: A Promising Model for Testing Safety of Candidate Microbicides", Sexually Transmitted Diseases 36(5): 312-318.
Vogelstein et al. (1999) "Digital PCR," Proc Natl Acad Sci USA 96(16): 9236-9241.
Walker (2006) "Quantification of immunohistochemistry—issues concerning methods, utility and semiquantitative assessment I", Histopathology 49: 406-410.
Wang et al. (2008) "Plasmonic nearfield scanning probe with high transmission," Nano Letters, vol. 8, No. 9, pp. 3041-3045.
Ward (1963) "Hierarchical grouping to optimize an objective function," Journal of the American statistical association 58(301): 236-244.
Watanabe et al. (2013) "Wide-area scanner for high-speed atomic force microscopy," Review of Scientific Instruments 84: 053702-1-053702-10.
Wittes et al. (1999) "Searching for Evidence of Altered Gene Expression: a Comment on Statistical Analysis of Microarray Data," J. Natl. Cancer Inst. 91(5): 400-401.
Ye et al. (2001) "Fluorescent microsphere-based readout technology for multiplexed human single nucleotide polymorphism analysis and bacterial identification," Human Mutation 17(4): 305-316.
Yeung (1999) "Study of single cells by using capillary electrophoresis and native flourescene detection," Journal of Chromatography A 830: 243-262.
Yokota et al. (1999) "Spin-stretching of DNA and Protein Molecules for Detection by Fluorescence and Atomic Force Microscopy," Analytical Chemistry 71: 4418-4422.
Yushchenko et al. (2012) "Tailoring Fluorescent Labels for Far-Field Nanoscopy", Springer 14: 159-188.
Zhang et al. (2009) "Copy Number Variation in Human Health, Disease, and Evolution," Annu. Rev. Genomics Hum. Genet. 10: 451-481.
Zhang et al. (publicly available Aug. 2015) "Ultrahigh-throughput single-molecule spectroscopy and spectrally resolved super-resolution microscopy" Nature Methods 12(10): 935-938 (published Oct. 2015).
Li et al. (2016) "Strong Amplitude and Phase Modulation of Optical Spatial Coherence with Surface Plasmon Polaritons," Dec. 29, 2016, retrieved from the internet [https://arxiv.org/pdf/1612.09153.pdf] on Mar. 14, 2017, 7 pages.
Lindquist et al. (2010) "Three-dimensional plasmonic nanofocusing," Nano Letters, vol. 10, pp. 1369-1373.
Llopis et al. (1998) "Measurement of cytosolic, mitochondrial, and Golgi pH in single living cells with green fluorescent proteins," Proceedings of the National Academy of Sciences 95: 6803-6808.
Lu et al. (1997) "Single-molecule spectral fluctuations at room temperature," Letters to Nature 385: 143-146.
Lyding et al. (1996) "Reduction of hot electron degradation in metal oxide semiconductor transistors by deuterium processing," Applied Physics Letters 68(18): 2526-2528.
Macqueen (1967) "Some methods for classification and analysis of multivariate observations," in Proceedings of the fifth Berkeley symposium on mathematical statistics and probability (Oakland, CA, USA.): 281-297.
Manley et al. (2008) "High-density mapping of single-molecule trajectories with photoactivated localization microscopy," Nature Methods 5(2): 155-157.

(56) References Cited

OTHER PUBLICATIONS

Matsuzaki et al., "Superresolution vibrational imaging by simultanous detecting of Raman and hyper-Raman scattering", Optics Letters, Optical Society of America, US, vol. 36, No. 13, Jul. 1, 2011, 3 pages.
Mead (1966) "Metal-semiconductor surface barriers," Solid-State Electronics 9: 1023-1033.
Meister et al. (2010) "Label-Free Imaging of Metal-Carbonyl Complexes in Live Cells by Raman Microspectroscopy," Angewandte Chemie International Edition 49: 3310-3312.
Min et al. (2011) "Coherent Nonlinear Optical Imaging: Beyond Fluorescence Microscopy," Annual Review of Physical Chemistry 62: 507-530.
Mlodzianoski et al. (Mar. 2016) "Super-Resolution Imaging of Molecular Emission Spectra and Single Molecule Spectral Fluctuations" Plos One 11(3): 1- 12.
Moerner (2007) "Single-molecule chemistry and biology special feature: New directions in single-molecule imaging and analysis" Proceedings of the National Academy of Sciences of the United States of America 104(39): 12596-12602.
Molen et al. (2005) "Role of shape and localized resonances in extraordinary transmission through periodic arrays of subwavelength holes: Experiment and theory," Physical Review B, vol. 72, 045421.
Najiminaini et al. (2011) "Optical resonance transmission properties of nano- hole arrays in a gold film: effect of adhesion layer," Optics Express, vol. 19, No. 27, Dec. 19, 2011, pp. 26186-26197.
Nandakumar et al. (2009) "Vibrational imaging based on stimulated Raman scattering microscopy," New Journal of Physics 11: 033026, pp. 1-9.

* cited by examiner

Photo of Current Second Harmonic Generation Setup
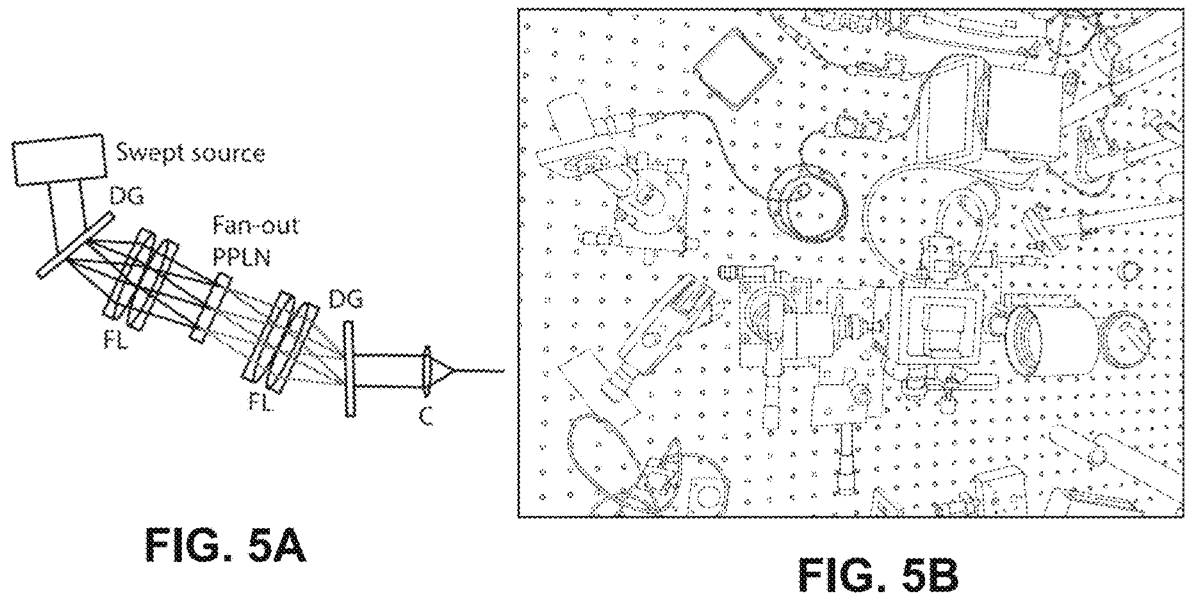
FIG. 5A
FIG. 5B
Visible Spectrum Spans Most of the Crystal Width
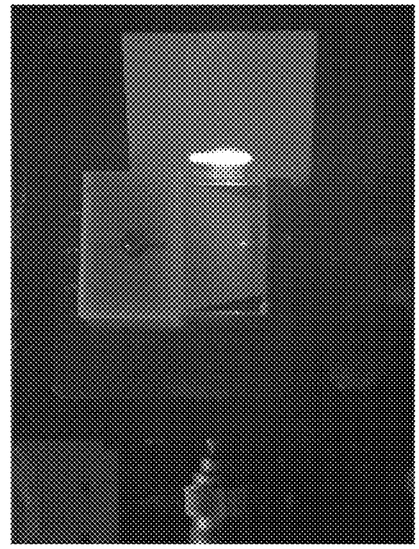
FIG. 6

Swept Source Vis-OCT Spectrum

- Theoretical bandwidth is 75 nm
- Currently achieving 72% of theoretical bandwidth z = 0 mm Interference Fringe

PSF z = 1 mm

Interference Fringe

PSF z = 2 mm z = 2.54 mm (Maximum Depth)
Theoretical maximum = ~2.8 mm

SYSTEM AND METHODS OF VISIBLE LIGHT SWEPT-SOURCE OPTICAL COHERENCE TOMOGRAPHY

CROSS-REFERENCE TO RELATED APPLICATIONS

This application claims the benefit of priority to U.S. Provisional Patent Application No. 63/462,083, filed Apr. 26, 2023, which is hereby incorporated by reference in its entirety.

STATEMENT REGARDING FEDERALLY SPONSORED RESEARCH OR DEVELOPMENT

The subject matter of the present disclosure was developed using government support under grant numbers EY033001 and EY029121 awarded by the National Institutes of Health. The government has certain rights in the invention.

FIELD

The present disclosure relates to optical coherence tomography (OCT) and, in particular, to visible light OCT. The present disclosure specifically provides a visible light source for visible light OCT and a method for generating a broadband spatially coherent visible light output for visible light OCT and other applications. This method can potentially be broadly applied to a wider wavelength range of electromagnetic radiation, in addition to visible light.

BACKGROUND

Visible light optical coherent tomography (OCT) covering the wavelength range of 450 nm-700 nm has shown advantages over near-infrared OCT in achieving hemoglobin oxygen saturation in the blood vessels down to the capillaries level and higher resolution and contrast images, which makes visible light OCT a unique and promising technology for different clinical applications. Vis-OCT also offers much higher spatial resolution (up to 1 micrometer) in biological tissues than any near-infrared (NIR) OCT. Currently, the only commercially available light source suitable for vis-OCT is the nonlinearly generated supercontinuum laser, which inherently suffers from power-dependent noise, commonly referred to as relative intensity noise (RIN). As a result, vis-OCT often exhibits limited SNR and needs a sophisticated dual-spectrometer balanced detection to increase SNR. However, balanced detection increases the complexity of the vis-OCT system, increases the system cost, and requires routine spectrometer calibration, all of which negatively impact the overall benefit-cost ratio (BCR) of vis-OCT. The optimal solution is to develop swept-source vis-OCT, where dual-spectrometers are replaced with two balanced single-element photodetectors to provide high-speed imaging, mitigation of RIN and wash-out effect for a wide-field imaging, and extended roll-off performance and imaging depth. However, while swept-sources are commonly used in NIR OCT systems, due to the lack of visible light (450 nm to 700 nm range) broadband optical amplifiers, there are no available visible light swept-sources suitable for developing a visible light, swept-source OCT.

BRIEF DESCRIPTION OF THE DRAWINGS

Embodiments of the present disclosure will be described in even greater detail below based on the exemplary figures.

The present disclosure is not limited to the exemplary embodiments. All features described and/or illustrated herein can be used alone or combined in different combinations in embodiments of the present disclosure. The features and advantages of various embodiments will become apparent by reading the following detailed description with reference to the attached drawings, which illustrate the following:

FIGS. 5A and 5B provide a schematic illustration and a photograph of a system for generating a second harmonic of a broadband near-infrared light source;

FIG. 6 is a photograph of the fan-out quasi-phase matching crystal converts the input near-infrared light into a visible light, in this case, a red light;

DETAILED DESCRIPTION

Figure 1:
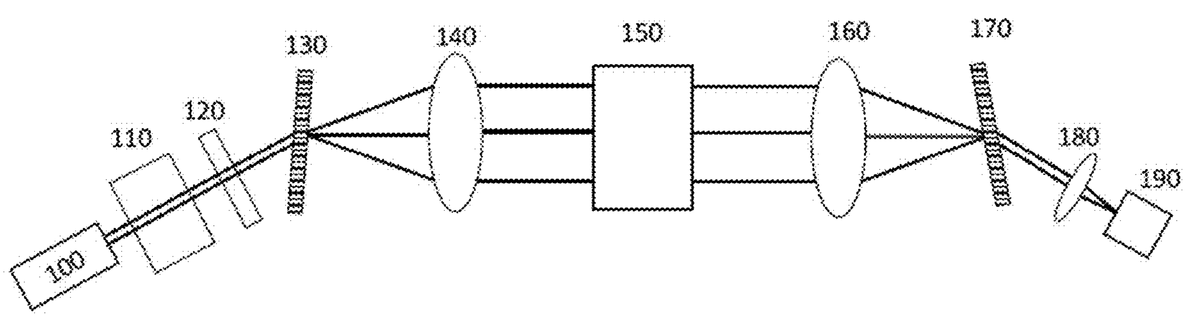
FIG. 1 illustrates an overall design of a broadband visible light swept-source laser using fan-out quasi-phase matching crystal to coherently convert the input near-infrared (NIR) light into the visible light.

The present disclosure provides a new visible light swept source that enables ultrafast visible light OCT to operate at a faster rate to reduce the motion artifacts and increase the field of view without sacrificing image quality. The new visible light swept source further provides for improved roll-off performance and mitigation of influence of RIN and wash-out effect for wide-field imaging. With a much-improved increase in imaging speed, increased signal-to-noise ratio (SNR), and increased imaging depth, visible light swept-source OCT (vis-ss-OCT) has the capability to perform more accurate functional and structural imaging.

According to a first aspect, the present disclosure provides a method for generating a broadband, visible light source, for example, for vis-ss-OCT. In an embodiment of the method according to the first aspect, a broadband and visible light tunable laser is generated by employing a quasi-phase matching or other phase-matching conditions in the non-linear photonic crystals to convert a broadband wavelength to a desired spectral range. One of the most popular methods to increase the efficiency of the non-linear wavelength transformation is the use of periodically poled lithium niobate (PPLN) crystals. The method includes but is not limited to using second harmonic generation (SHG) or sum frequency generation (SFG) from near-infrared to the visible spectrum. The PPLN or other non-linear photonic crystal is pumped by spatially dispersed near-infrared light. The spatial dispersion of the crystal nonlinearity period and of the near-infrared light is matched within a quasi-phase-matching (QPM) condition. SHG or SFG photons are continuously produced along the light propagation direction at each spatial position. Thus, the output from the crystal is broadband SHG or SFG light. The near-infrared light can be pre-amplified before pumping into the PPLN crystal to achieve the desired output SHG power and increase conversion efficiency. The polarization of near-infrared light is adjusted to maximize the wavelength conversion efficiency due to the birefringence of PPLN crystal nonlinear properties. The dispersed SHG light is spatially converged by the dispersion elements to co-locate spectral frequencies and provide a collimated beam. In this manner, the method according to the third aspect of the disclosure converts a tunable NIR source into a visible, broadband spatially coherent swept light source.

The wavelength conversion efficiency realized by the method according to the first aspect is proportional to the square of pump light intensity, and many applications will benefit from higher power output. However, the broadband optical amplifier with more than 150 nm is not available, and the gain is limited to 25 dB. The method according to the present disclosure thereby provides for amplifying broadband near-infrared light to overcome the bandwidth and gain limitations of optical amplifiers. The present disclosure coherently combines two or more optical amplifiers with or without shifted center wavelengths to increase the bandwidth and power of amplified light.

The present disclosure coherently combines two or more optical amplifiers for increasing the power and/or output spectral bandwidth of the amplified light. Coherently combining multiple optical amplifiers of the similar operation wavelength range can increase the power of NIR by more than 10×, which corresponds to more than 100× increase in the visible light power output. Combining multiple optical amplifiers of the dissimilar operation wavelength range can increase the resulting wavelength range of output NIR light. The combination of the two within the present disclosure can improve the wavelength conversion efficiency to more than 100× and increase the output bandwidth to 2× or more by using two or more optical amplifiers.

Figures 12A, 12B, 13:
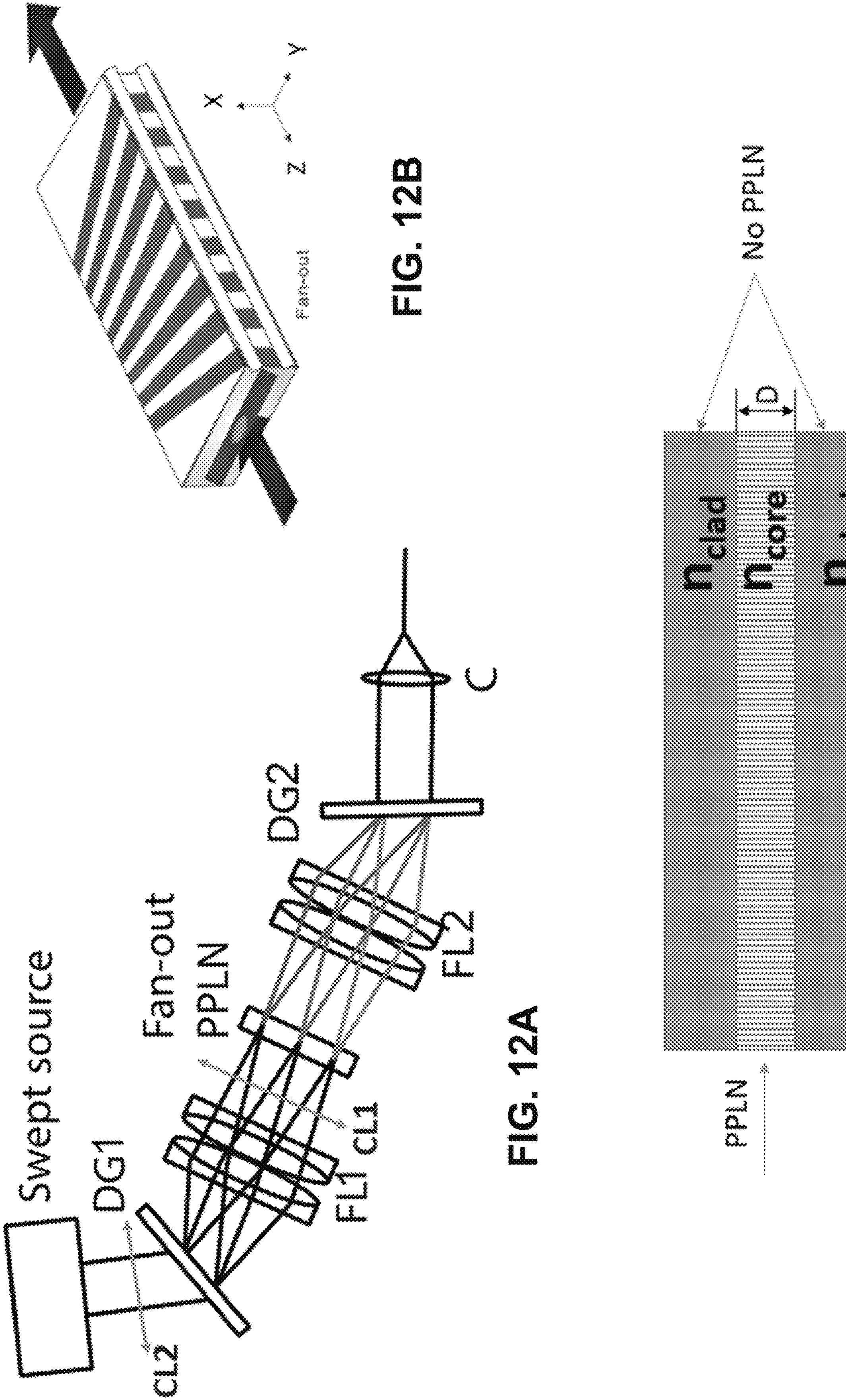
FIGS. 12A and 12B illustrates a system for converting NIR light to visible light that implements additional spatial confinement of the light along a thickness of a fan-out quasi-phase matching crystal (12A) and a quasi-phase matching crystal (12B)
FIG. 13 illustrates the planar waveguide geometry, in the thickness direction, of the fanout quasi-phase matching crystal of FIG. 12.

To increase the intensity of the pump light the present disclosure utilizes a planar waveguide, where the confinement of the light along X direction is orthogonal to the wavelength dispersion across the PPLN crystal along Y direction (FIG. 13). In this case, due to the confinement properties of the planar waveguide in the X direction, the light will be prevented from diffraction, and the beam size in this direction will be constant and equal to the mode diameter of the planar waveguide. In comparison with the general concept shown in FIG. 1, the addition of the confinement of optical energy along X direction favorably increase the power density of the input NIR light within the PPLN crystal and thus, increasing the efficiency of converting incident NIR light into the visible light output. To match the IR light source beam size with the mode size in the X direction cylindrical optics can be used. For example, the cylindrical lens (CL1) can be put between the regular lens that is focusing the pump light dispersed by the diffractive grating (FL1) and the QPM (PPLN) crystal. A cylindrical lens (CL2) can also be used before the diffractive grating (DG1) or in combination with the CL1 (FIG. 12). Similarly, at the output of the non-linear crystal the visible light can be conjugated with the single-mode or polarization-maintaining fiber or collimated using cylindrical optics as well.

The present disclosure provides a system design for visible light swept-source based OCT, which overcomes the limit of A-line scanning speed constraint and wash-out effects in the spectrometer-based visible light OCT.

The present disclosure provides a method of comparing frequency and phase matching between multiple pairs or more combinations of modulated light with highly defined temporal features. To this end, a light with multiple channels separated by a wavelength shift can enter the elements 110-150 in FIG. 1 while the reference modulated signals can be multiplexed before or after element 100 and the PPLN crystal variable nonlinearity at different lateral locations (for example but not limited to fanout) can provide quasi-phase matching condition between different modulated signals and reference signals thus providing broadband phase matching between multiple desired pairs of modulated signals and references simultaneously providing single or multiple comparisons. The modulated signals can be phase matched with a single or multiple reference signals.

Figure 11:
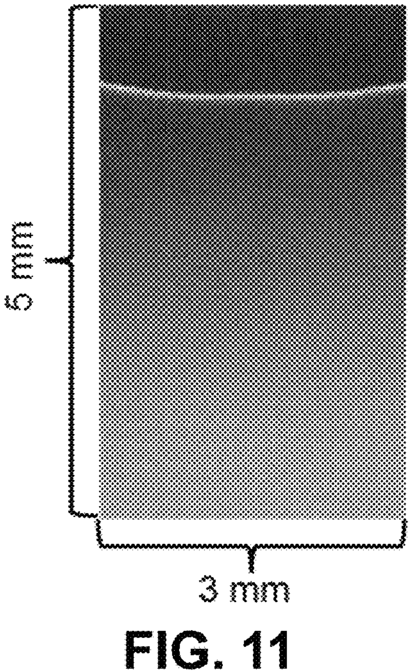
FIG. 11 is a representative B-scan image of a piece of paper using vis-ss-OCT system, where imaging depth is 5 mm and lateral imaging range is 3 mm. The use of a doubled-frequency K-clock effectively doubles the imaging depth from 2.5 mm to 5 mm.

Imaging depth of the ss-vis-OCT is ultimately limited by the instantaneous line-width of the swept source. Using an ultrafast linear-in-time digitizer with sample rate of 1.8 GHz, we estimated that the line-width of ss-vis-OCT is shorter than 8 pm, thus limiting maximum possible imaging depth to 25 mm. To avoid severe signal degradation with depth, a linear k-clock must be implemented, for example, using an auxiliary Mach-Zehnder interferometer. The maximum imaging depth that can be achieved with the linear k-clock is 2.5 mm, which is limited by the step in k-domain $z_{im}=\pi/2\Delta k$, where $\Delta k$ is the step in the k-domain. Imaging depth can be further increased using a system to double, quadruple, etc. the frequency of the linear k-clock output from the detector, as discussed U.S. Pat. No. 8,049,900, which is incorporated by reference herein. FIG. 11 shows an OCT image of the paper where 5 mm imaging depth was achieved using the doubled K-clock.

The output of the visible light can be coupled into a single-mode or polarization-maintaining fiber to be used for other optical setups, including visible-light OCT, optical microscopy, neurostimulation, nanophotonics sensing, materials sensing, and information communication.

In an embodiment of the method according to the first aspect, the method includes generating broadband near-infrared (NIR) light via a NIR light source, amplifying the NIR light to provide amplified broadband NIR light, dispersing the amplified broadband NIR light via a wavelength-to-angle transform optical assembly to provide angularly dispersed broadband NIR light, collimating the angularly dispersed broadband NIR light via a position-to-angle transform optical assembly to provide spatially dispersed broadband NIR light and directing the spatially dispersed broadband NIR light to a non-linear photonic crystal, and converting, by the non-linear photonic crystal, the spatially dispersed broadband NIR light to broadband visible light.

In an embodiment, the converting, by the non-linear photonic crystal, the spatially dispersed broadband NIR light to visible light can include generating, via the non-linear photonic crystal, a second harmonic frequency of the spatially-dispersed broadband NIR light as the visible light.

In an embodiment, amplifying the broadband NIR light can include amplifying the broadband NIR light via an optical amplification module, wherein the optical amplification module includes two or more optical amplifiers.

In an embodiment, the method further includes adjusting the polarization of the amplified broadband NIR light to maximize a wavelength conversion efficiency of the non-linear photonic crystal.

In an embodiment, the broadband visible light is spatially dispersed broadband visible light, and method further includes directing the spatially dispersed broadband visible light to a second position-to-angle transform optic and focusing the spatially dispersed broadband visible light, via the second focusing optic, to provide focused broadband visible light, collecting the focused broadband visible light via a second wavelength-to-angle transform optic to provide collected broadband visible light, and coupling the collected broadband visible light into an optical fiber via a fiber coupling lens.

In an embodiment, the wavelength-to-angle transform optic is a grating, a prism, a grism, a MEMS scanner, a resonance scanner, a polygon scanner, or a combination of those, and the second wavelength-to-angle transform optic is a grating, a prism, a grism, a MEMS scanner, a resonance scanner or a polygon scanner, or a combination of those the position-to-angle transform optic is a lens, and the second position-to-angle transform optic is a second lens.

In an embodiment, the non-linear photonic crystal is a periodically poled lithium niobate (PPLN) crystal.

In an embodiment, a spatial dispersion of the crystal non-linearity period of the non-linear photonic crystal and a spatial dispersion of the spatially dispersed broadband NIR light are matched within a quasi-phase matching (QPM) condition.

According to a second aspect, the present disclosure provides a novel design for a visible light swept source. In an embodiment of the second aspect, the visible light swept source includes a low-coherence, near-infrared (NIR) light source configured to generate broadband NIR light, an optical amplification module configured to amplify the broadband NIR light to provide amplified broadband NIR light, a wavelength-to-angle transform optic configured to angularly disperse the amplified broadband NIR light to provide angularly dispersed broadband NIR light, a position-to-angle transform optic configured to collimate the angularly dispersed broadband NIR light to provide spatially dispersed broadband NIR light, and a non-linear photonic crystal configured to receive the spatially dispersed broadband NIR light and convert the spatially dispersed broadband NIR light to broadband visible light.

In an embodiment, the non-linear photonic crystal is configured to convert the spatially dispersed broadband NIR light to the broadband visible light by generating a second harmonic frequency of the spatially-dispersed broadband NIR light as the broadband visible light.

In an embodiment, the optical amplification module includes two or more optical amplifiers.

In an embodiment, the broadband visible light source further includes a polarizer configured to adjust the polarization of the amplified broadband NIR light to maximize the wavelength conversion efficiency of the non-linear photonic crystal.

In an embodiment, the broadband visible light is spatially dispersed broadband visible light, and the broadband visible light source further includes a second position-to-angle transform optic configured to focus the spatially dispersed broadband visible light onto a second wavelength-to-angle transform optic, the second wavelength-to-angle transform optic, configured to spatially overlap the spatially dispersed broadband visible light to provide collected broadband visible light, and a fiber coupling lens configured to couple the collected broadband visible light into an optical fiber.

In an embodiment, the wavelength-to-angle transform optic is a grating, a prism, or a polygon scanner, the second wavelength-to-angle transform optic is a grating, a prism, or a polygon scanner, the position-to-angle transform optic is a lens, and the second position-to-angle transform optic is a second lens.

In an embodiment, the non-linear photonic crystal is a periodically poled lithium niobate (PPLN) crystal.

In an embodiment, a spatial dispersion of the crystal non-linearity period of the non-linear photonic crystal and a spatial dispersion of the spatially dispersed broadband NIR light are matched within a quasi-phase matching (QPM) condition.

According to a third aspect, the present disclosure provides a novel vis-ss-OCT system. In an embodiment of the third aspect, the vis-ss-OCT system includes a broadband visible light source according to the second aspect, a sample arm, a reference arm, and a balanced photodetector configured to detect interference signals in light reflected from the sample arm and light reflected from the reference arm.

In an embodiment, the vis-ss-OCT system further includes a fiber coupler configured to divide the broadband visible light and direct a first portion of the broadband visible light to a Mach-Zehnder, Michelson, or other interferometer and to direct a second portion of the broadband visible light to a second fiber coupler, the Mach-Zehnder, Michelson, or other interferometer, and the second fiber coupler, configured to direct a first component of the second portion of the broadband visible light to the sample arm and to direct a second component of the second portion of the broadband visible light to the reference arm.

In an embodiment, the vis-ss-OCT system further includes a second balanced photodetector configured to detect the first portion of the broadband visible light after transmission by the Mach-Zehnder interferometer to provide a K-clock.

In an embodiment, the vis-ss-OCT system further includes a digitizer configured to collect signals provided by the K-clock and the balanced photodetector.

Figure 2:
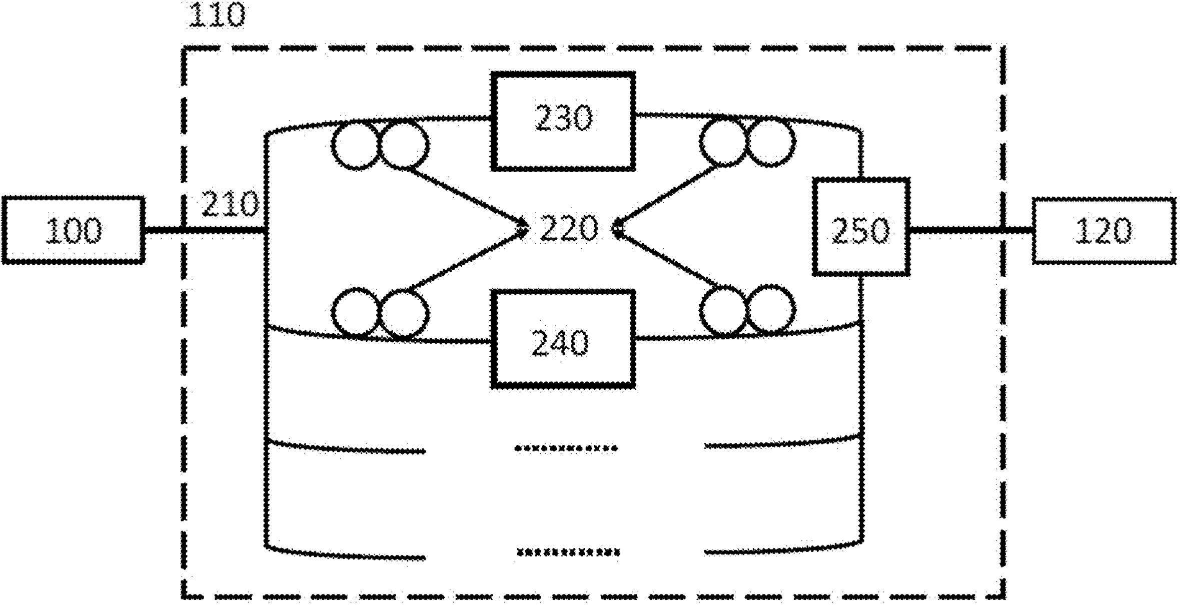
FIG. 2 illustrates a scheme for enhancing the power of the input NIR swept source, for the benefit of maximizing the power output from the broadband visible light swept-source laser of FIG. 1.

FIG. 1 illustrates a fan-out quasi-phase matching crystal based broadband tunable laser frequency doubler. A tunable laser 100 emits the light into the optical amplification module 110. Details of the optical amplification module are illustrated in FIG. 2. The polarization of the amplified light can be modulated by a half-wave plate or other polarization modifying element 120 to match the desired polarization stage of the wavelength converting fan-out crystal 150. A dispersion grating 130 can be used to disperse the beam into different frequencies, the dispersed beam can be focused by a focusing lens module 140 into the wavelength converting fan-out crystal 150, where the beam meets the quasi-phase-matching condition and newly generated photons grow along with the crystal. After propagating through the wavelength converting fan-out crystal, the original beam is converted to a new second harmonic frequency that fall into the visible range. A collecting focusing lens module can be used to focus the beam onto a collecting grating 170 to gather the dispersed beam into a collimated beam. A collimator can be used to couple the visible light beam into single mode fiber to the visible light OCT system 190.

FIG. 2 illustrates a broadband optical amplification module, such as the optical amplification module 110 of FIG. 1. A 50:50 fiber coupler 210 splits the beam from tunable laser 100 into two optical paths. Another ratio such as 60:40, 70:30, 80:20, 90:10 coupler can be used but the max efficiency is provided by 50:50 coupler. Each path contains an optical amplifier 230, 240 and two polarization controllers 220 before and after optical amplifiers. Polarization controllers can be optional if polarization maintenance fiber is used. PM fiber polarization axis must be aligned with the PBS axis. The center wavelength of the optical amplifiers can be different. The two optical paths can be combined by a polarizing beam splitter 250. The combined beam can be coherently combined into a broader band. The optical delay line in one or both arms of the setup can be used to adjust the optical path length between the arms to provide constructive interference at the PBS. This setup can also be implemented to combine more than two optical amplifiers of similar operating wavelength range to perform higher output power and gain. This setup can be further implemented to combine optical amplifiers of dissimilar operating wavelength range to broaden the spectral range of the NIR light. The further combination of these capabilities can improve the wavelength conversion efficiency to more than 100× and increase the output bandwidth to 2× or more.

Figure 3:
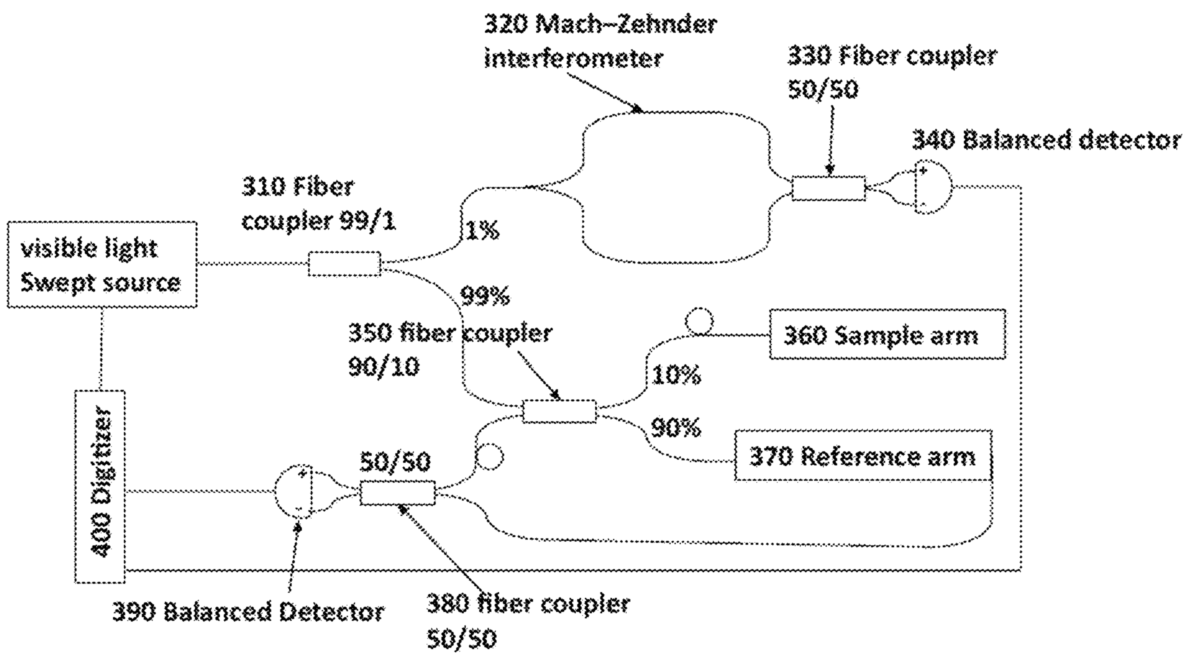
FIG. 3 illustrates a visible light swept-source OCT (vis-ss-OCT) system utilizing the broadband tunable laser of FIG. 1.

FIG. 3 illustrates a visible light swept-source OCT (vis-ss-OCT) system. In the vis-ss-OCT system, 1% of the swept-source light divided by a 99/1 or other ratio fiber coupler 310 and sent to Mach-Zehnder interferometer (MZI) 320 then detected by a balanced photodetector 340 to generate a K-clock. 99% of the swept-source light is redirected for OCT imaging. A 90/10 (or other ratios) ratio fiber coupler 350 can be used to separate the beam, where 10% is sent to a sample arm 360 and the remaining 90% is sent to a reference arm 370 to create interference. The interference signals in the arms of the 50/50 (or other ratios) fiber coupler 380 are shifted by 180 degrees and can be detected by a balanced photodetector 390. The K-clock provided by the MZI interferometer, A-line trigger and OCT signal can be collected by digitizer 400.

Figure 4:
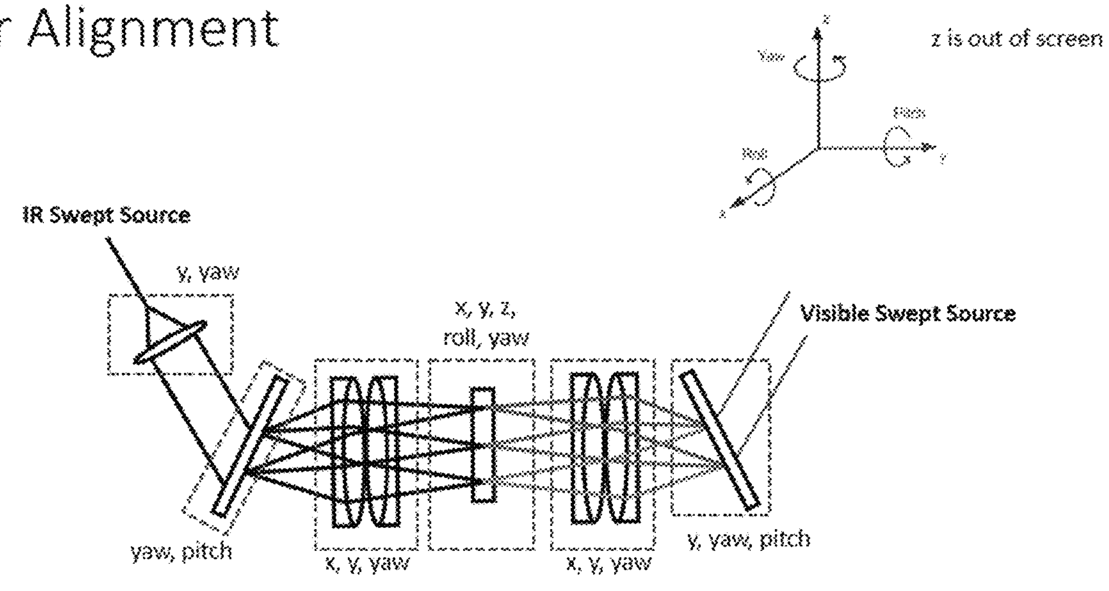
FIG. 4 illustrates the envisioned mechanical degrees of freedom to consider for alignment of all optical and opto-mechanical components for the broadband visible light swept-source laser of FIG. 1.

FIG. 4 illustrates the envisioned mechanical degrees of freedom to consider for alignment of all optical and opto-mechanical components for the broadband visible light swept-source laser of FIG. 1.

FIGS. 5A and 5B comprises a schematic illustration (5A) and a photograph (5B) of a system for generating a second harmonic of a broadband near-infrared light source.

FIG. 6 is a photograph of the fan-out quasi-phase matching crystal converts the input near-infrared light into a visible light, in this case, a red light.

Figure 7:
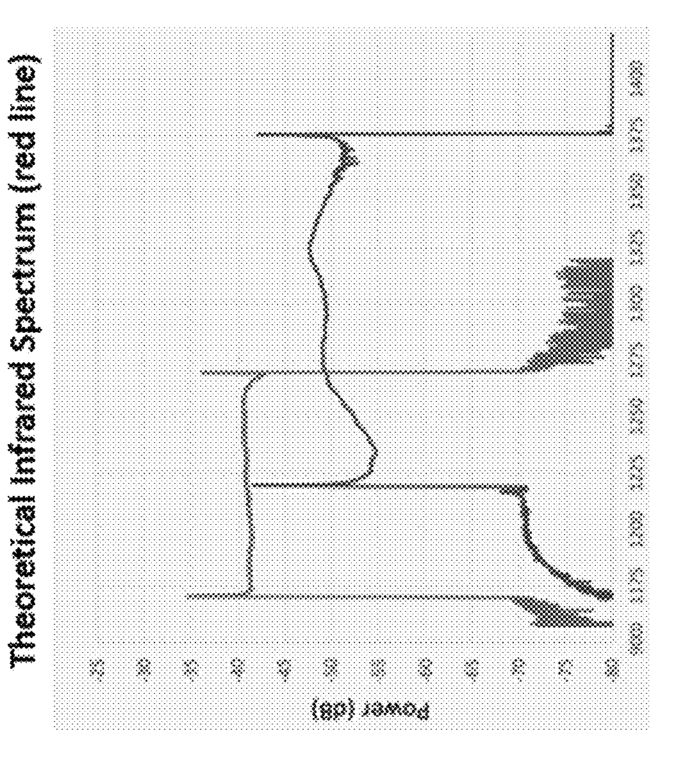
FIG. 7 illustrates the examples of output visible light spectrum from the broadband visible light swept-source laser of FIG. 1 (Blue line), and the spectrum of the input NIR light (Red line)
Figure 7:
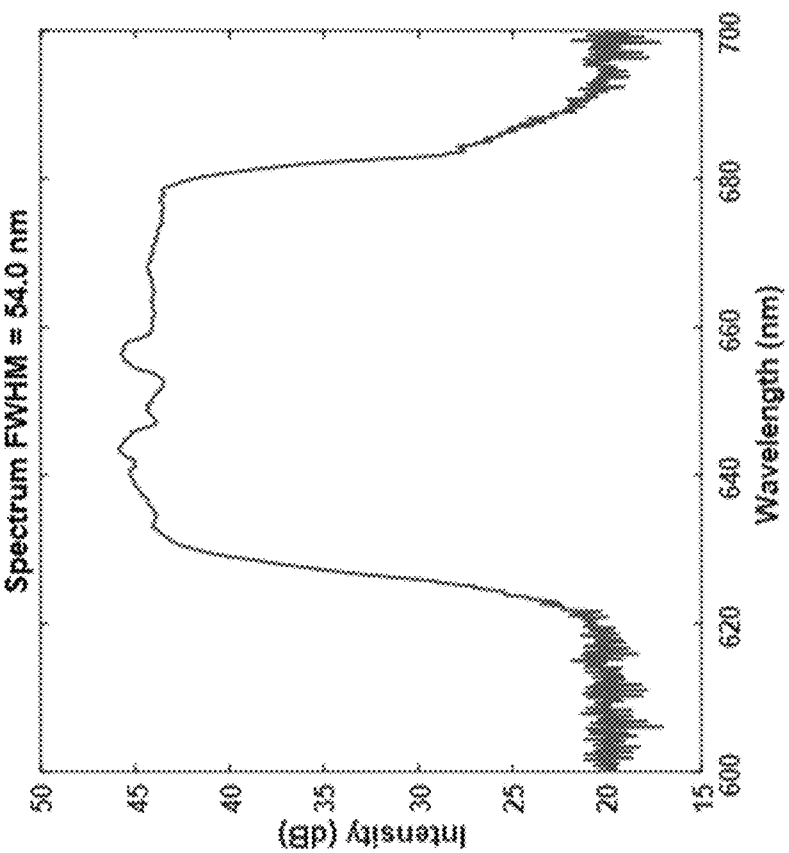

FIG. 7 illustrates the examples of output visible light spectrum from the broadband visible light swept-source laser of FIG. 1 (Blue line), and the spectrum of the input NIR light (Red line).

Figure 8:
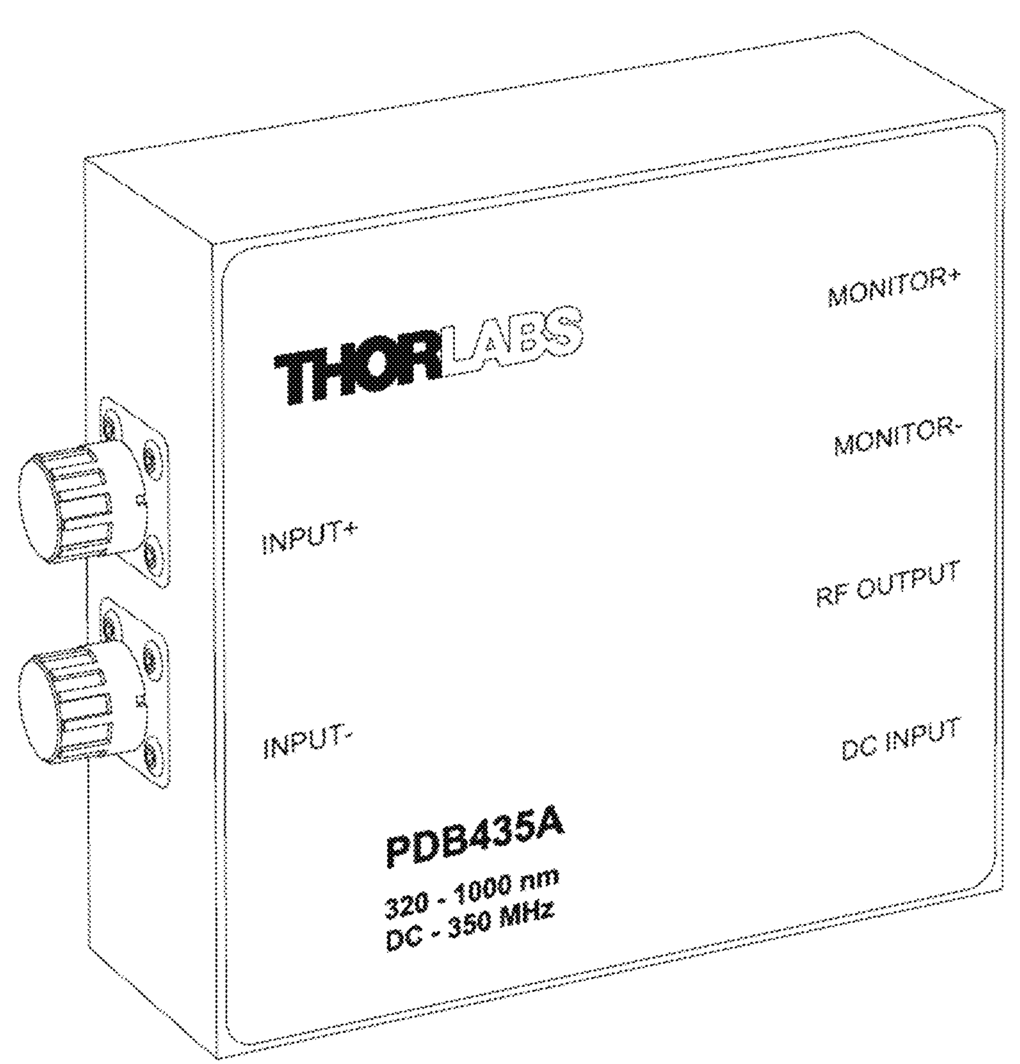
FIG. 8 illustrates a representative example of the balanced photodetector that can be used as element 340 in the vis-ss-OCT system of FIG. 3.
Figure 9A:
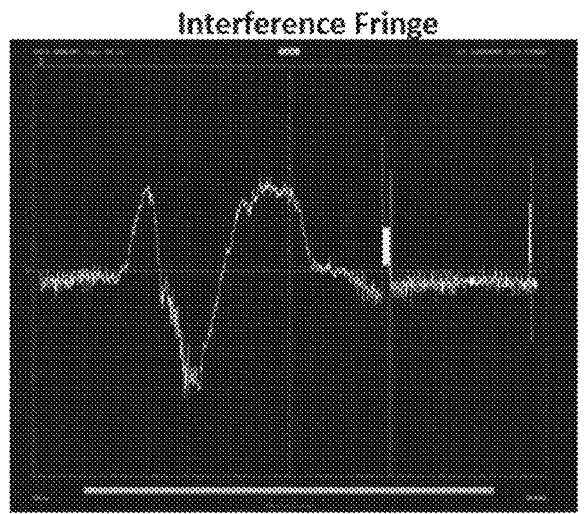
FIGS. 9A through 9D illustrate interference fringes and point spread functions (PSF) for a vis-ss-OCT system at different imaging depth.
Figure 9A:
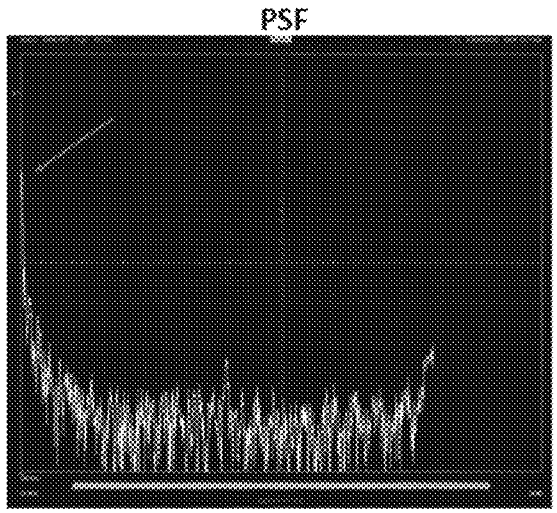
Figure 9B:
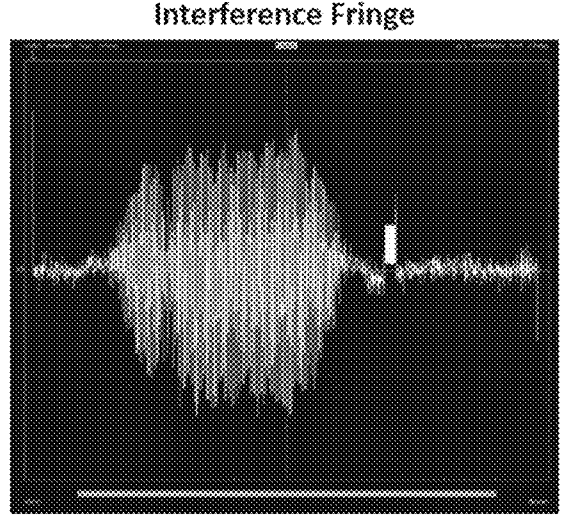
Figure 9B:
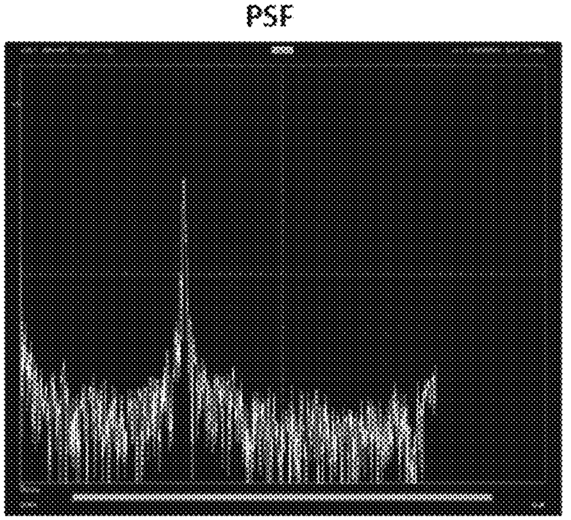
Figure 9C:
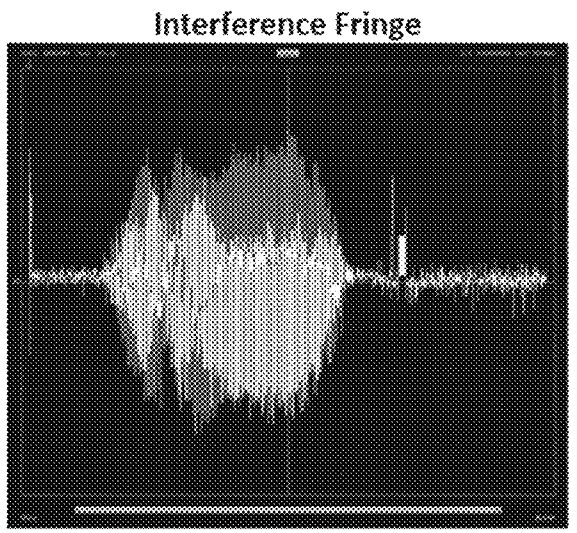
Figure 9C:
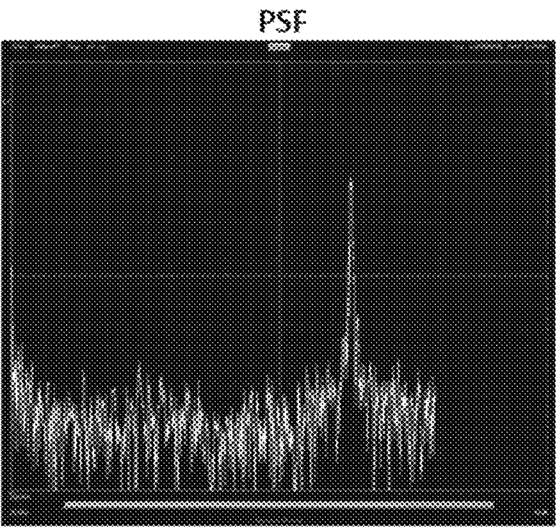
Figure 9D:
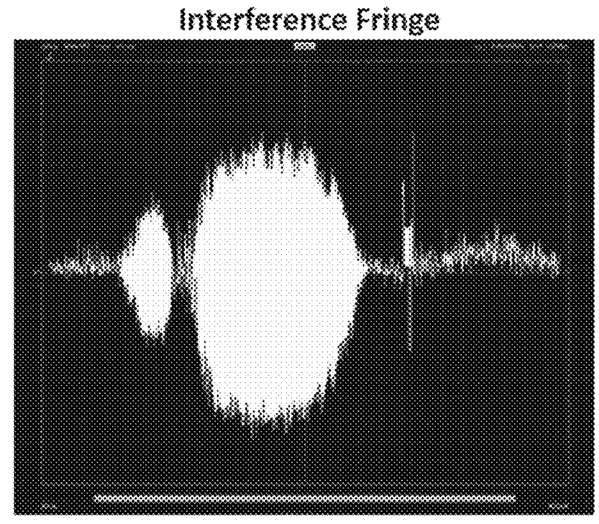
Figure 9D:
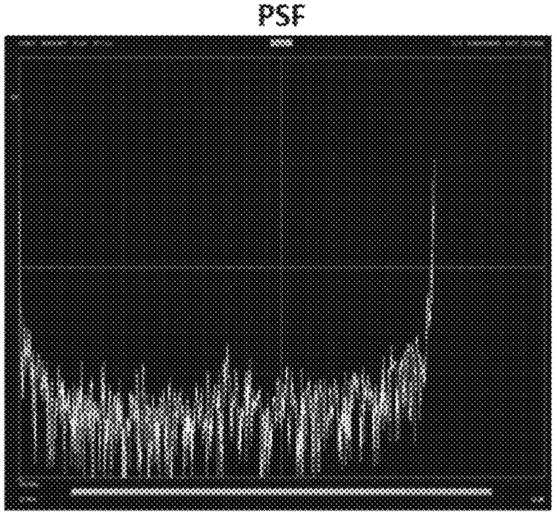

FIG. 8 illustrates a representative example of the balanced photodetector that can be used as element 340 in the vis-ss-OCT system of FIG. 3.

FIGS. 9A through 9D illustrate interference fringes and point spread functions (PSF) for a vis-ss-OCT system at different imaging depth.

Figure 10:
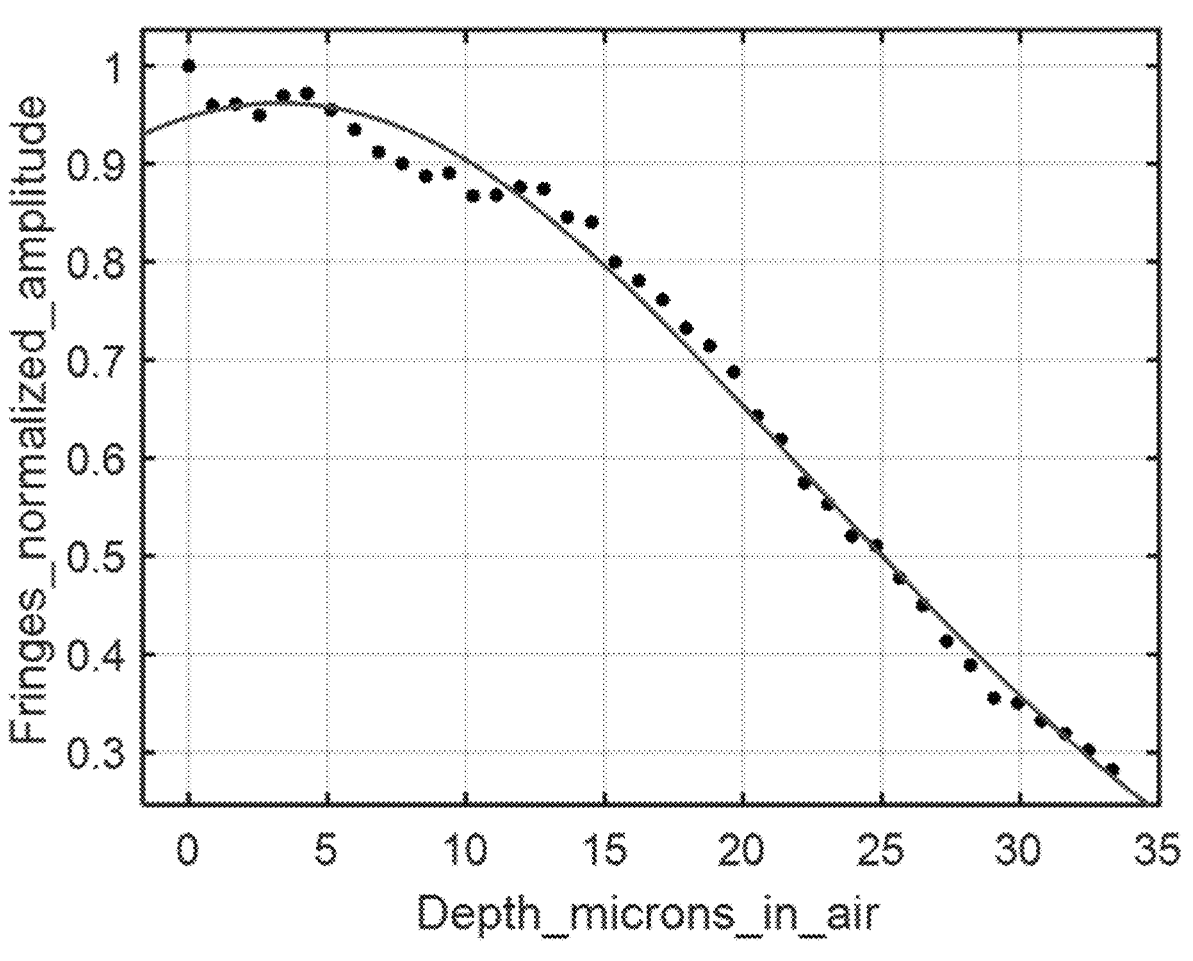
FIG. 10 shows theoretical (Solid dots) and experimental measurements (Blue line) of normalized amplitude of the interference fringes as the function of the image depth of the vis-ss-OCT system using ultra-fast clock signals that are linear in time.

FIG. 10 shows a theoretical relationship (blue line) and experimental measurements (solid dots) of normalized amplitude of the interference fringes as a function of the image depth of the vis-ss-OCT system using ultra-fast clock signals that are linear in time.

FIG. 11 is a representative B-scan image of a piece of paper using vis-ss-OCT system, where imaging depth is 5 mm and lateral imaging range is 3 mm. The use of a doubled-frequency K-clock effectively doubles the imaging depth from 2.5 mm to 5 mm.

FIGS. 12A and 12B illustrate the method to improve the efficiency for converting NIR light to visible light by implementing the additional spatial confinement of the light along the thickness of the fan-out quasi-phase matching crystal. FIG. 12A illustrates the addition of the cylindrical optics to focus NIR light into the fan-out quasi-phase matching crystal. Similarly, cylindrical optics can also be used to couple the visible light output into the single-mode, polarization maintaining or multimode optical fiber. FIG. 12B illustrates the fan-out quasi-phase matching crystal.

FIG. 13 illustrates the planar waveguide geometry, in the thickness direction, of the fanout quasi-phase matching crystal of FIG. 12. The fanout PPLN layer of a height D is sandwiched between the top and bottom layers without PPLN optical material. The PPLN layer is acting as a core of the planar waveguide and the top and bottom layers serve as cladding. To this end, the refractive index of the PPLN layer ($n_{core}$) is higher than the refractive index of the top and bottom layers ($n_{clad}$).

The power of the broadband SHG generation using a fanout quasi-phase matching (QPM) crystal can be limited due to the low average intensity in the crystal (the efficiency of the SHG generation is proportional to the intensity of the pump light squared and linearly to the length of the crystal): focusing on the large spot provides low intensity and focusing sharp leads to the diffraction loses. For example, optimal focusing on the 25 mm long crystal of the Gaussian beam is approximately lead to 60 μm waist in the center of the crystal.

To increase the intensity of the pump light we suggest using a planar waveguide, where the confinement of the light is orthogonal to the direction (X) of the wavelength dispersion across the crystal. In this case, due to the confinement properties of the planar waveguide in the X direction, the light will be prevented from diffraction, and the beam size in this direction will be constant and equal to the mode diameter of the planar waveguide.

The confinement structure of the planar waveguide in the X direction must provide single-mode performance. The single mode condition is $$\frac{D\sqrt{n_{core}^2 - n_{clad}^2}}{\lambda} < \frac{1}{2}.$$

The beam size in the X direction propagating in the PPLN layer in the Z direction is equal to the mode size of the planar waveguide. To match the pump beam size with the mode size in the X direction cylindrical optics can be used. For example, the cylindrical lens (CL1) can be put between the regular lens that is focusing the pump light dispersed by the diffractive grating (FL1) and the QPM (PPLN) crystal. A cylindrical lens (CL2) can also be used before the diffractive grating (DG1) or in combination with the CL1. For example, for the D=7.5 μm and pump wavelength of 1300 nm the single mode condition achieved at $$\sqrt{n_{core}^2 - n_{clad}^2} < 0.087.$$

In this case the mode diameter of the planar waveguide is 11 μm and the power of the output SHG is 114 times higher than the SHG power for the optimal focusing condition on the regular PPLN crystal of 25 mm length.

Figure 14A:
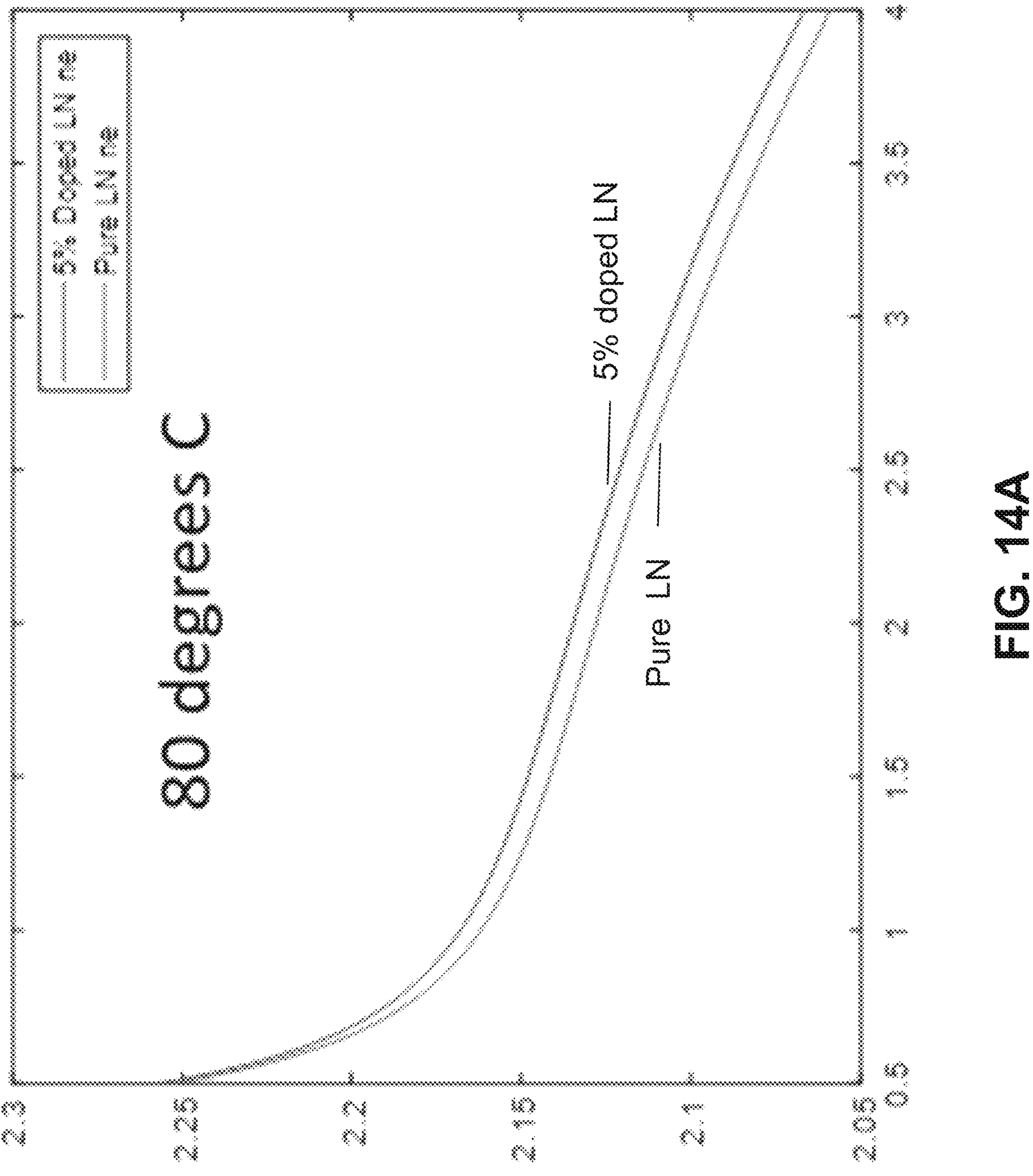
FIGS. 14A through 14C illustrate variation of waveguide properties at different waveguide temperatures.
Figure 14B:
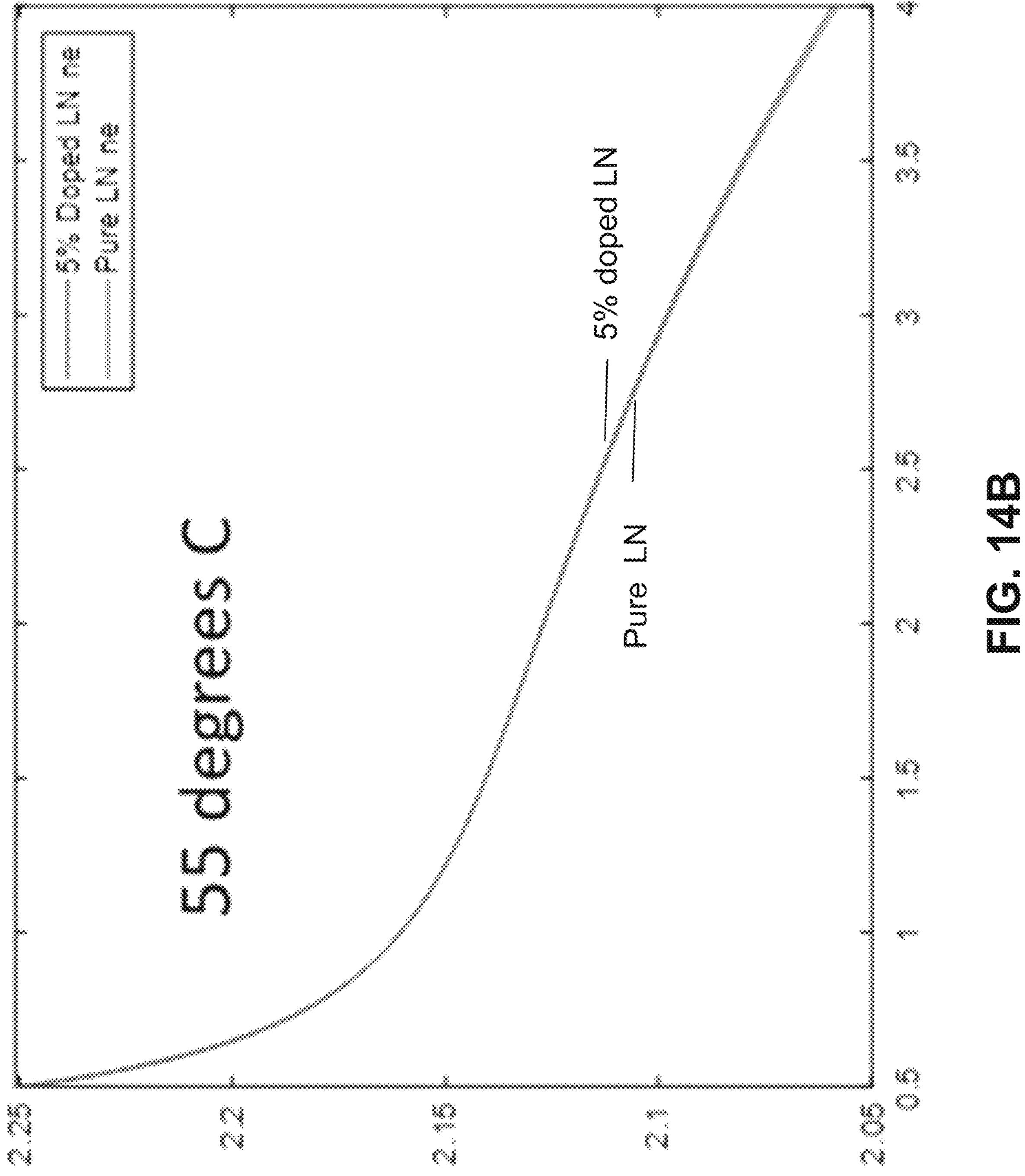
Figure 14C:
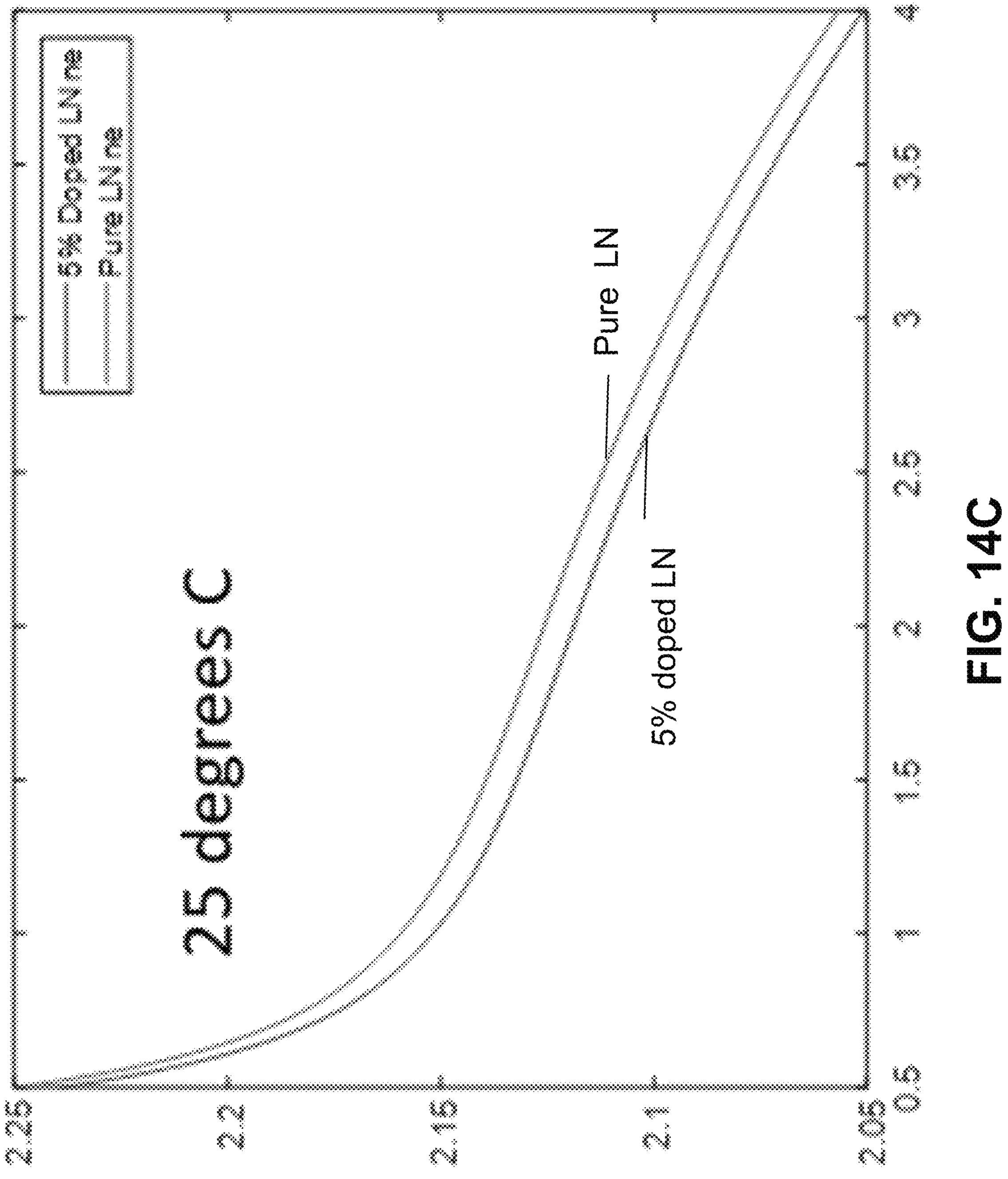

FIGS. 14A through 14C illustrate variation of waveguide properties at different waveguide temperatures. The waveguide properties can be controlled by the temperature of the planar waveguide. For example in the case of the PPLN layer made of the 5% doped Lithium Niobite with MgO and the top and bottom layers made of Lithium Niobite without doping the structure is behave as a waveguide only for the temperature over 55 degrees. Temperature control of the PPLN crystal with planar waveguide can be used to control the mode diameter of the planar waveguide and thus optimal matching with the beam size in X direction of the pump light focusing optics.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100—light source: tunable laser/broadband spatially coherent source
110—optical amplification module
120—polarization adjustment
130—dispersion element, grating/prism/polygon scanner
140—focusing lens module of the pump wavelength
150—wavelength converting non-linear fan-out crystal
160—collecting converted wavelength lens module
170—wavelength combining dispersion element, grating/prism/polygon scanner
180—fiber coupling lens (optional)
190—OCT system/optical imaging system
210—fiber coupler
220—polarization controller
230—optical amplifier
240—optical amplifier
250—polarizing beam splitter
310—fiber coupler
320—Mach-Zehnder interferometer (MZI)
330—fiber coupler
340—photodetector
350—fiber coupler
360—sample arm
370—reference arm
380—fiber coupler
390—photodetector
400—digitizer

What is claimed is:

1. A method for generating broadband visible light, the method comprising:

generating broadband near-infrared (NIR) light via a NIR light source;

amplifying the NIR light to provide amplified broadband NIR light;

dispersing the amplified broadband NIR light via a wavelength-to-angle transform optical assembly to provide angularly dispersed broadband NIR light;

collimating the angularly dispersed broadband NIR light via a position-to-angle transform optical assembly to provide spatially dispersed broadband NIR light and directing the spatially dispersed broadband NIR light to a non-linear photonic crystal; and converting, by the non-linear photonic crystal, the spatially dispersed broadband NIR light to broadband visible light.

2. The method according to claim 1, wherein the converting, by the non-linear photonic crystal, the spatially dispersed broadband NIR light to visible light comprises generating, via the non-linear photonic crystal, a second harmonic frequency of the spatially-dispersed broadband NIR light as the visible light.

3. The method according to claim 1, wherein amplifying the broadband NIR light comprises amplifying the broadband NIR light via an optical amplification module, wherein the optical amplification module includes two or more optical amplifiers.

4. The method according to claim 1, wherein the broadband NIR source is built by combining two wavelength shifted broadband sources via a dichroic mirror or a fiber coupler.

5. The method according to claim 1, wherein two NIR light sources are shifted in wavelength and combined in a single optical path via a dichroic mirror or a fiber coupler, and wherein the spatially dispersed broadband NIR light is converted to broadband visible light via the non-linear photonic crystal by using a sum harmonic frequency generation.

6. The method according to claim 1, wherein the broadband visible light is spatially dispersed broadband visible light, the method further comprising:

directing the spatially dispersed broadband visible light to a second position-to-angle transform optical assembly and focusing the spatially dispersed broadband visible light, via the second focusing optical assembly, to provide focused broadband visible light;

collecting the focused broadband visible light via a second wavelength-to-angle transform optical assembly to provide collected broadband visible light; and coupling the collected broadband visible light into an optical fiber via a fiber coupling lens.

7. The method according to claim 1, wherein a higher refractive index periodically poled lithium niobate (PPLN) layer of the non-linear photonic crystal is sandwiched between lower refractive index layers to provide a single-mode planar waveguide.

8. The method according to claim 7, further comprising providing cylindrical optics before and/or after the wavelength-to-angle transform optical assembly.

9. The method according to claim 1, further comprising adjusting the polarization of the amplified broadband NIR light to maximize a wavelength conversion efficiency of the non-linear photonic crystal.

10. The method according to claim 6, wherein the wavelength-to-angle transform optic is a grating, a prism, or a polygon scanner,
- wherein the second wavelength-to-angle transform optic is a grating, a prism, or a polygon scanner,
- wherein the position-to-angle transform optic is a lens, and
- wherein the second position-to-angle transform optic is a second lens.

11. The method according to claim 1, wherein the non-linear photonic crystal is a periodically poled lithium niobate (PPLN) crystal.

12. The method according to claim 1, wherein a spatial dispersion of a crystal non-linearity period of the non-linear photonic crystal and a spatial dispersion of the spatially dispersed broadband NIR light are matched within a quasi-phase matching (QPM) condition.

13. A broadband visible light source, comprising:
- a low-coherence, near-infrared (NIR) light source configured to generate broadband NIR light;
- an optical amplification module configured to amplify the broadband NIR light to provide amplified broadband NIR light;
- a wavelength-to-angle transform optic configured to angularly disperse the amplified broadband NIR light to provide angularly dispersed broadband NIR light;
- a position-to-angle transform optic configured to collimate the angularly dispersed broadband NIR light to provide spatially dispersed broadband NIR light;
- a non-linear photonic crystal configured to receive the spatially dispersed broadband NIR light and convert the spatially dispersed broadband NIR light to broadband visible light.

14. The broadband visible light source according to claim 13, wherein the non-linear photonic crystal is configured to convert the spatially dispersed broadband NIR light to the broadband visible light by generating a second harmonic frequency of the spatially-dispersed broadband NIR light as the broadband visible light.

15. The broadband visible light source according to claim 13, wherein the optical amplification module includes two or more optical amplifiers.

16. The broadband visible light source according to claim 13, further comprising a polarizer configured to adjust the polarization of the amplified broadband NIR light to maximize a wavelength conversion efficiency of the non-linear photonic crystal.

17. The broadband visible light source according to claim 13, wherein the broadband visible light is spatially dispersed broadband visible light, the broadband visible light source further comprising:
- a second position-to-angle transform optic configured to focus the spatially dispersed broadband visible light onto a second wavelength-to-angle transform optic;
- the second wavelength-to-angle transform optic configured to spatially overlap the spatially dispersed broadband visible light to provide collected broadband visible light; and
- a fiber coupling lens configured to couple the collected broadband visible light into an optical fiber.

18. The broadband visible light source according to claim 17, wherein the wavelength-to-angle transform optic comprises one or more of a grating, a prism, a grism, a liquid crystal grating, a polygon scanner, a microelectromechanical systems (MEMS) scanner, and/or a resonance scanner,
- wherein the second wavelength-to-angle transform optic comprises one or more of a grating, a prism, a grism, a polygon scanner, a MEMs scanner, and/or a resonance scanner,
- wherein the wavelength-to-angle transform optic can be made from metamaterials,
- wherein the position-to-angle transform optic is a lens, a metalens, or a reflecting focuser,
- wherein the second position-to-angle transform optic is a second lens, a second metalens, or a second reflecting focuser, and
- wherein the wavelength-to-angle transform optic, and the second wavelength-to-angle transform optic can be realized using a single metamaterial or regular optical material element.

19. The broadband visible light source according to claim 13, wherein the non-linear photonic crystal is a periodically poled lithium niobate (PPLN) crystal.

20. The broadband visible light source according to claim 19, wherein a spatial dispersion of a crystal non-linearity period of the non-linear photonic crystal and a spatial dispersion of the spatially dispersed broadband NIR light are matched within a quasi-phase matching (QPM) condition.

21. A visible light swept-source optical coherence tomography (OCT) (vis-ss-OCT) system, comprising:
- the broadband visible light source according to claim 13;
- a sample arm;
- a reference arm; and
- a photodetector configured to detect interference signals comprised by light reflected from the sample arm and light reflected from the reference arm.

22. The vis-ss-OCT system according to claim 21, further comprising:
- a fiber or other light splitter configured to divide the broadband visible light and direct a first portion of the broadband visible light to the sample arm and to direct a second portion of the broadband visible light to the reference arm;
- wherein the light splitter is configured to deliver the light reflected from the sample arm and the the light reflected from the reference arm to the detector, and
- wherein the detector is configured to detect interference signals comprised by the light reflected from the sample arm and the light reflected from the reference arm.

23. The vis-ss-OCT system according to claim 22, further comprising:
- a fiber or other splitter configured to divide the broadband visible light and direct a first portion of the broadband visible light to a Mach-Zehnder interferometer and to direct a second portion of the broadband visible light to a second fiber coupler;
- the Mach-Zehnder interferometer; and
- the second fiber coupler, configured to direct a first component of the second portion of the broadband visible light to the sample arm and to direct a second component of the second portion of the broadband visible light to the reference arm.

24. The vis-ss-OCT system according to claim 22, further comprising a second balanced photodetector configured to detect the first portion of the broadband visible light after transmission by the Mach-Zehnder interferometer to provide a K-clock.

25. The vis-ss-OCT system according to claim 24, further comprising electronics to increase frequency of the K-clock by squaring or producing higher power transform of the detected the K-clock.

26. The vis-ss-OCT system according to claim 24, further comprising a digitizer configured to collect signals provided by the K-clock and the balanced photodetector.

27. A visible light swept-source optical coherence tomography (OCT) (vis-ss-OCT) system, comprising:

the broadband visible light source according to claim 13;

a sample arm;

a reference arm; and a balanced photodetector or two independent photodetectors configured to detect interference signals comprised by light reflected from the sample arm and light reflected from the reference arm.

* * * * *